(12) United States Patent
Mazonson et al.

(10) Patent No.: US 12,512,209 B2
(45) Date of Patent: Dec. 30, 2025

(54) SYSTEMS AND METHODS FOR MEDICAL IMAGING GATEWAYS

(71) Applicant: Alara Imaging Inc., Westport, CT (US)

(72) Inventors: Nathan Mazonson, Westport, CT (US); Simon Rascovsky, Westport, CT (US); Max Orelus, Westport, CT (US); Mohannad A. K. Hussain, Westport, CT (US); James Crosby, Westport, CT (US); Jeremy Knickerbocker, Westport, CT (US)

(73) Assignee: ALARA IMAGING INC., Westport, CT (US)

( * ) Notice: Subject to any disclaimer, the term of this patent is extended or adjusted under 35 U.S.C. 154(b) by 0 days.

(21) Appl. No.: 19/264,639

(22) Filed: Jul. 9, 2025

(65) Prior Publication Data

US 2025/0337714 A1    Oct. 30, 2025

Related U.S. Application Data

(63) Continuation of application No. PCT/US2024/037588, filed on Jul. 11, 2024.
(Continued)

(51) Int. Cl.
*G16H 30/20* (2018.01)
*G06T 7/62* (2017.01)
(Continued)

(52) U.S. Cl.
CPC .............. *G16H 30/20* (2018.01); *G06T 7/62* (2017.01); *G16H 10/60* (2018.01); *G16H 15/00* (2018.01);
(Continued)

(58) Field of Classification Search
CPC ....... H04L 63/029; H04L 67/12; G16H 10/60; G16H 30/20; G16H 40/67; G16H 50/70
See application file for complete search history.

(56) References Cited

U.S. PATENT DOCUMENTS 7,386,462 B2 * 6/2008 Silva-Craig ............ G16H 30/40
382/128
8,364,500 B2 * 1/2013 Eisenberger ....... G06Q 30/0601
600/300
(Continued)

FOREIGN PATENT DOCUMENTS

WO    WO-2025015156 A2    1/2025

OTHER PUBLICATIONS

AI in Medical Imaging Market, Healthcare, Precedence Research, [retrieved on Dec. 2023]. Retrieved from the Internet URL: https://www.precedenceresearch.com/ai-in-medical-imaging-market.
(Continued)

*Primary Examiner* — Hosuk Song
(74) *Attorney, Agent, or Firm* — WILSON SONSINI GOODRICH & ROSATI

(57) ABSTRACT

The present disclosure provides a gateway edge system. The gateway edge system comprise a data orchestration engine comprising a plurality of modules configured to receive and process data according to a workflow and dynamically route the processed data to one or more entities that are in communication with the gateway edge system, the gateway edge system is configured to be deployed within a firewall of the healthcare system, and the plurality of modules comprises an ingestion and normalization module configured to: receive input data from a plurality of electronic data sources located within the healthcare system, wherein the plurality of electronic data sources comprises at least two different sources and wherein the at least two different sources comprise an EHR, a radiology electronic clinical
(Continued)

data system, PACS, radiation dose data, a billing system or a claim system and normalize the input data by mapping to a standardized data model.

34 Claims, 15 Drawing Sheets

Related U.S. Application Data

(60) Provisional application No. 63/513,103, filed on Jul. 11, 2023.

(51) Int. Cl.
| | |
|---|---|
| *G16H 10/60* | (2018.01) |
| *G16H 15/00* | (2018.01) |
| *G16H 20/40* | (2018.01) |
| *G16H 40/63* | (2018.01) |
| *H04L 9/40* | (2022.01) |
| *H04L 12/66* | (2006.01) |
| *H04L 67/12* | (2022.01) |

(52) U.S. Cl.
CPC ............ *G16H 20/40* (2018.01); *G16H 40/63* (2018.01); *H04L 12/66* (2013.01); *H04L 63/02* (2013.01); *H04L 63/029* (2013.01); *H04L 67/12* (2013.01)

(56) References Cited

U.S. PATENT DOCUMENTS

| | | | | |
|---|---|---|---|---|
| 8,638,924 | B2 * | 1/2014 | Wellons | H04Q 3/62 379/265.09 |
| 8,825,775 | B2 * | 9/2014 | Bohner | G16H 40/20 709/206 |
| 10,176,893 | B2 * | 1/2019 | Sysko | G16Z 99/00 |
| 10,729,396 | B2 * | 8/2020 | Reicher | G16H 50/30 |
| 11,087,878 | B2 * | 8/2021 | Vesto | G16H 50/50 |
| 11,538,560 | B2 * | 12/2022 | Kohli | G06F 40/40 |
| 11,587,652 | B1 * | 2/2023 | Willis | G06F 11/0709 |
| 11,636,927 | B2 * | 4/2023 | Power | G06F 16/283 705/3 |
| 12,014,220 | B2 * | 6/2024 | Park | G06F 9/5055 |
| 12,353,432 | B2 * | 7/2025 | Zhang | G06F 16/221 |
| 2016/0210427 | A1 | 7/2016 | Mynhier et al. | |
| 2019/0156921 | A1 | 5/2019 | Kohli et al. | |
| 2023/0162837 | A1 | 5/2023 | Olivares et al. | |

OTHER PUBLICATIONS

Alara Imaging Announces Relationship with AWS to Help Transform Medical Imaging. Press Release [online]. [retrieved on Nov. 15, 2022]. Retrieved from the Internet: URL: https://static1.squarespace.com/static/634d90a160e37516e78d6dfb/t/637411973336d72f9438118b/1668551063917/Alara+Imaging+and+AWS+HealthLake+Imaging+Press+Release+11.15.2022.pdf.
AWS HealthImaging. Retrieved from the Internet: URL: https://aws.amazon.com/healthimaging/.
Considerations for designing IoT-based infrastructure for smart hospitals. [Blog article] EffectiveSoft. [online]. Retrieved Jun. 30, 2024 at URL: https://www.effectivesoft.com/blog/iot-for-smart-hospitals.html#conclusion. 15 pages.
De Gonzalez, Amy Berrington et al. Projected cancer risks from computed tomographic scans performed in the United States in 2007. Archives of Internal Medicine, vol. 169, No. 22, Dec. 14, 2009, pp. 2071-2077 [online], [retrieved on Dec. 3, 2018]. Retrieved from the Internet URL: https://www.ncbi.nlm.nih.gov/pmc/articles/PMC6276814/.
Dieguez, Gabriela et al. A Multi-year Look At The Cost Burden Of Cancer Care. Milliman Search Report, 24 Pages [online], [retrieved on Apr. 11, 2017]. Retrieved from the Internet URL: https://www.milliman.com/en/insight/2017/a-multi-year-look-at-the-cost-burden-of-cancer-care#.
IoT Edge Gateways with Management and Container Orchestration for Device Applications. Arm. [online], [retrieved Jun. 30, 2024 at URL: https://armkeil.blob.core.windows.net/developer/Files/pdf/iot/pelion-device-management-edge-docker.pdf. 1 page.
MDinteractive. CMS Releases 2022 MIPS Final Rule—Key Takeaways. [retrieved on Nov. 5, 2021]. Retrieved from the Internet URL: https://mdinteractive.com/mips-blog/cms-releases-2022-mips-final-rule-key-takeaways.
Measure Applications Partnership 2022 Considerations for Measure Set Review in Federal Programs—Final Report, National Quality Forum, [retrieved on Sep. 23, 2022]. Retrieved from the Internet URL: https://www.qualityforum.org/Publications/2022/09/2022_MAP_Considerations_for_Measure_Set_Review_in_Federal_Programs_-_Final_Report.aspx.
NHE Fact Sheet, National health expenditure data. Data & Research [online]. CMS.gov Centers for Medicare & Medicaid Services, [retrieved on Mar. 24, 2020]. Retrieved from the Internet: URL: https://www.cms.gov/data-research/statistics-trends-and-reports/national-health-expenditure-data/nhe-fact-sheet.
PCT/US2024/037588 International Search Report and Written Opinion dated Oct. 1, 2024.
RadNet Equity Presentation, [retrieved on Apr. 15, 2018]. Retrieved from the Internet URL: https://www.radnet.com/sites/corporate/files/radnet/imce/investor-relations/RadNet%20Equity%20Presentation%20-%20Updated%204-15-18.pdf.
Rebecca, Pifer. Google Launches Suite of Digital Tools Around Medical Images, Healthcare Dive, [retrieved on Oct. 6, 2022]. Retrieved from the Internet URL: https://www.healthcaredive.com/news/google-launch-suite-of-digital-tools-medical-images/633494/#:~:text=Billions%20of%20medical%20images%20are,to%20research%20from%20Cornell%20University.
Redberg, Rita Fran,. We Are Giving Ourselves Cancer. OP-ED Contributors, The New York Times, [retrieved on Jan. 30, 2014]. Retrieved from the Internet URL: https://www.nytimes.com/2014/01/31/opinion/we-are-giving-ourselves-cancer.html.
Smith-Bindman, Rebecca et al. Comparison of the Effectiveness of Single-Component and Multicomponent Interventions for Reducing Radiation Doses in Patients Undergoing Computed Tomography: A Randomized Clinical Trial. Randomized Controlled Trial, vol. 180, No. 5, May 1, 2020, pp. 666-675 [online], [retrieved on Mar. 30, 2020]. Retrieved from the Internet URL: https://pubmed.ncbi.nlm.nih.gov/32227142/ DOI: 10.1001/jamainternmed.2020.0064.
Smith-Bindman, Rebecca et al. Environmental Causes Of Breast Cancer And Radiation From Medical Imaging: Findings From The Institute Of Medicine Report. Archives of Internal Medicine, vol. 172, No. 13, Jul. 9, 2012, pp. 1023-1027 [online], [retrieved on Feb. 27, 2014]. Retrieved from the Internet URL: https://www.ncbi.nlm.nih.gov/pmc/articles/PMC3936791/.
Smith-Bindman, Rebecca et al. International variation in radiation dose for computed tomography examinations: prospective cohort study. The BMJ, vol. 364, Jan. 2, 2019, 12 Pages [online], [retrieved on Jan. 3, 2019]. Retrieved from the Internet URL: https://www.bmj.com/content/364/bmj.k4931 DOI: 10.1136/bmj.k4931.
Total Number of Medicare Beneficiaries by Type of Coverage, State Health Facts [online]. KFF The independent source for health policy research, polling, and news, [retrieved on 2021]. Retrieved from the Internet: URL: https://www.kff.org/medicare/state-indicator/total-medicare-beneficiaries/?currentTimeframe=0&selectedDistributions=total-medicare-enrollment&sortModel=%7B%22colId%22:%22Location%22,%22sort%22:%22asc%22%7D.
UC DOSE Project and Recent Research Call for Standard Protocols for CT Scan Doses, Patient Care, UCSF—Department of Radiology & Biomedical Imaging, [retrieved on Mar. 4, 2019]. Retrieved from the Internet URL: https://radiology.ucsf.edu/blog/uc-dose-project-and-recent-research-call-standard-protocols-ct-scan-doses.
Bui, Alex A. T. et al. OpenSourcePACS: an extensible Infrastructure for Medical Image Management. IEEE Transactions on Information Technology in Biomedicine 11(1):94-109 (2007).

(56) References Cited

OTHER PUBLICATIONS

Liu, Wei, and Eun Kyo Park. Big data as an e-health service. 2014 International conference on computing, networking and communications (ICNC). IEEE :982-988 (2014).

* cited by examiner

FIG. 6B

SYSTEMS AND METHODS FOR MEDICAL IMAGING GATEWAYS

CROSS-REFERENCE

This application is a continuation of International Application No. PCT/US2024/037588, filed on Jul. 11, 2024, which claims priority to U.S. Provisional Application No. 63/513,103, filed on Jul. 11, 2023, each of which is incorporated herein by reference in its entirety.

BACKGROUND

90% of all healthcare data is medical imaging data because of the size of medical imaging files. Today, industry estimates are that 85% of medical imaging data is stored onsite, rather than in a cloud environment. Cloud vendors are seeking to change that by reducing the cost of storing medical imaging data (e.g., radiology data) in the cloud by as much as 40%, while increasing the security associated with medical imaging cloud storage. However, it is challenging to move this data to and from health systems into their cloud environments due to lack of interoperability.

SUMMARY

A need exists for a bi-directional medical imaging gateway to assemble and transfer medical imaging data from inside an organization's firewall to the cloud, and back from the cloud to the site. However, current imaging gateway management can be cumbersome. For instance, current imaging gateways are typically non-trivial implementation projects and it requires accounting for a site's available IT personnel capacity and IT roadmap. It is a difficult and lengthy process to deploy and integrate an imaging gateway; new functionality deployment can be challenging. Further, management of multiple gateways can require significant IT resources. The present disclosure addresses the above needs and drawbacks of current solutions by providing an improved medical imaging gateway. In an aspect of the present disclosure, a cloud internet of things (IoT)-based framework for a health environment is provided. The framework comprises: a medical imaging gateway deployed to a health system, wherein the medical imaging gateway is deployed within a firewall of a health system and wherein the medical imaging gateway is configured to, at runtime, execute a containerized code within the medical imaging gateway for processing at least medical image data; and a cloud platform in remote communication with the medical imaging gateway, wherein the cloud platform comprises a container registry comprising at least a container-wrapped code module, wherein the code module is tested for vulnerability and is in compliance with a wrapper application program interface (API) of the medical imaging gateway; wherein the container-wrapped code module is deployed to the medical imaging gateway for execution.

In some embodiments, the medical imaging gateway is deployed in a virtual infrastructure of the health system and interfaces with one or more sources in the health system. In some cases, the medical imaging gateway is within a local network of the health system and in communication with the one or more sources using interoperability protocols. In some instances, a communication protocol between the medical imaging gateway and the cloud platform uses secured messaging MQTTS or HTTPS that is different from the interoperability protocols.

In another aspect of the present disclosure, a flexible data-driven gateway edge system for healthcare application is provided. The gateway edge system comprises: a data and task orchestration engine comprising a plurality of modules, wherein the data and task orchestration engine is configured to: receive an input data via a local network of a health system, selecting a subset of modules from the plurality of modules and sequencing the subset of modules to form a pipeline based at least in part on a type of the input data and a workflow, processing, using the pipeline, the input data and routing an output to one or more entities in communication with the flexible data-driven gateway edge system, wherein the output comprises anonymized data. In some cases, the flexible data-driven gateway is deployed to a health system and is deployed within a firewall of a health system.

In some embodiments, the input data comprises electronic health record (EHR) data and data from a radiology electronic clinical data system. In some cases, the radiology electronic clinical data system comprises Radiological Information System (RIS) or Picture Archiving and Communication System (PACS). In some embodiments, the pipeline comprises extract, transfer, and load (ETL) tasks. In some embodiments, the subset of modules is selected utilizing a machine learning algorithm trained model or a large language model. The machine learning (ML) models or large language models (LLM) may be continuously trained or updated based on new data or feedback data. The orchestrator of the gateway may continuously improve and perform self-learning to generate improved pipeline.

In some embodiments, the flexible data-driven gateway is within a local network of the health system and in communication with the one or more sources using interoperability protocols. In some embodiments, the plurality of modules comprises a machine learning module for processing the input data locally within the firewall of the health system. In some cases, the machine learning module comprises a model trained for processing a medical image data.

In another aspect, a method is provided for on-boarding software-as-a-service (SaaS) in a health environment. The method comprises: deploying a plurality of gateways to a plurality of health systems, wherein each gateway is deployed within a firewall of a respective health system; and displaying a pre-defined onboarding flow via a web-based portal for deploying the plurality of gateways, wherein the pre-defined onboarding flow comprises configuring each gateway and a pipeline to be deployed based on a user-selected workflow and wherein the web-based portal is provided by a cloud platform in remote communication with the plurality of gateways. In some embodiments, each gateway, at runtime, routes an output data to a plurality of entities. In some cases, the plurality of entities accesses the output data via a secure cloud credential.

In a further aspect, a gateway edge system for healthcare application is provided. The gateway edge system comprises: a quality measure component comprising: (i) a translation engine configured to receive an input data from a health system, process the input data to extract a plurality of elements, and translate the plurality of elements into a plurality of variables, (ii) a quality measure computation component configured to compute, based at least in part on the plurality of variables, a quality measure indicative of whether a radiation dose is (1) excessive (2) within a safe range or (3) inadequate; a data orchestration engine comprising a sequence of modules to receive and process the input data according to a workflow and transmit a processed data to one or more entities in communication with the gateway edge system, wherein the processed data comprise the quality measure. In some embodiments, the gateway edge system is deployed within the health system.

In some embodiments, the input data comprises electronic health record (EHR) data and data from a radiology electronic clinical data system. In some cases, the radiology electronic clinical data system comprises Radiological Information System (RIS) or Picture Archiving and Communication System (PACS). In some embodiments, the plurality of elements extracted from the input data comprise a radiation dose, or an image pixel data. In some embodiments, the plurality of variables comprises a computed tomography (CT) category, a size-adjusted radiation dose, and an image quality metric. In some cases, the CT category indicates a reason for a respective radiology imaging. In some cases, the image quality metric comprises an image noise level and is processed by the electronic quality measure component to determine whether the radiation dose is inadequate.

In some embodiments, the plurality of elements is extracted from Digital Imaging and Communications in Medicine (DICOM) metadata or an Health Level 7 (HL7) message. In some cases, the electronic quality measure is calculated based further on a first threshold corresponding to the size-adjusted radiation dose and a second threshold corresponding to the image quality metric. For example, the first threshold or the second threshold is specific to the CT category.

In some embodiments, the sequence of modules comprises the translation engine and the quality measure computation component. In some cases, the sequence of modules further comprises an ingestion module and a transmission module. In some cases, the sequence of modules further comprise a machine-learning based module. In some cases, a selection and an order of modules in the sequence are determined based on the workflow.

In some embodiments, the gateway edge system is deployed within a firewall of the health system. In some embodiments, the gateway edge system is deployed in a virtual infrastructure of the health system and interfaces with one or more sources in the health system.

In some embodiments, the gateway edge system provides a standardized connection between the health system and the one or more entities. In some embodiments, the gateway edge system is remotely managed by a cloud console. In some embodiments, the gateway edge system generates the electronic quality measure in real-time of receiving the input data and wherein the input data is received via a data push model of the data orchestration engine.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIGS. 6A-6B illustrate an example of an onboarding portal, in accordance with some embodiments;

DETAILED DESCRIPTION

Radiological Data Aggregation

Figure 1:
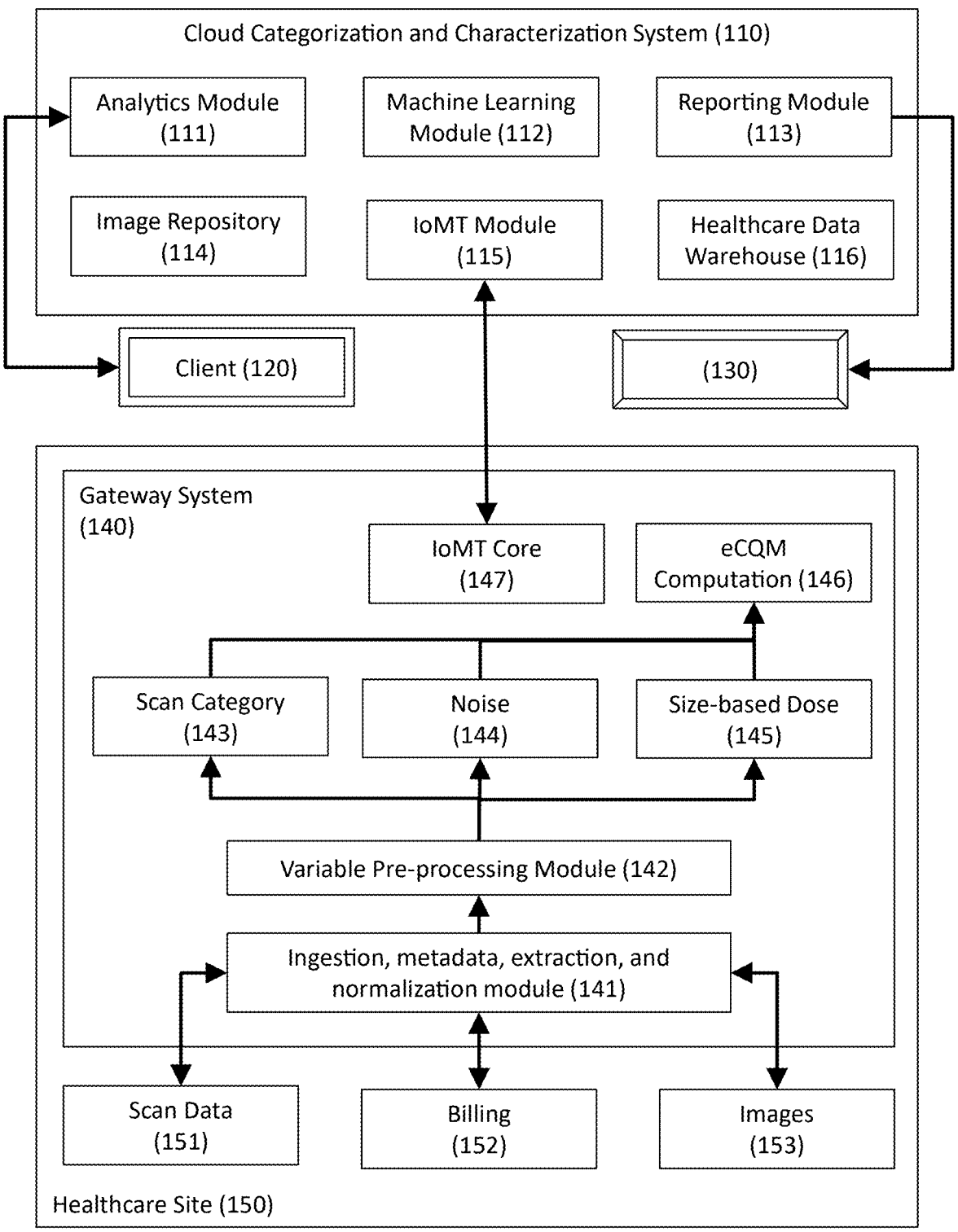
FIG. 1 shows a diagram of an exemplary Internet-of-Medical-Things platform, in accordance with some embodiments.

The methods, systems, and media herein derive standardized data elements from structured fields within both the electronic health record (EHR) and the radiology electronic clinical data systems, including the Radiological Information System (RIS) and the Picture Archiving and Communication System (PACS), which are the core information systems for data storage and practice management in nearly all radiology practices. Primary imaging data, including Radiation Dose Structured Reports (RDSRs, from which radiation dose is derived), and image pixel data (from which patient size and image noise are calculated) are stored in the PACS in Digital Imaging and Communications in Medicine (DICOM) format, a universally adopted standard for medical imaging information. These primary data elements may be translated into data elements that can be ingested by an Electronic Clinical Quality Measure (eCQM). The outputs of this translation may comprise a plurality of data elements mapped to a clinical terminology such as LOINC (Logical Observation Identifiers Names and Codes).

In some embodiments, the methods, systems, and media herein reside within local firewalls with all data securities in place. In some embodiments, the methods, systems, and media herein connect with local PACS and extract electronic data to quantify size-adjusted radiation dose and image quality. In some embodiments, the methods, systems, and media herein connect with local EHR and/or RIS and/or claims systems to extract the ICD-10-CM and CPT codes associated with the order and bill to assign the exam to a category. In some embodiments, the methods, systems, and media herein determine eligibility for each exam and identify missing data, which are flagged/recovered when possible. In some embodiments, the methods, systems, and media herein score each exam as in- or out-of-range based on having either excessive radiation dose or inadequate image quality relative to category-specific thresholds. In some embodiments, the methods, systems, and media herein aggregate scans at the reporting level (physician, physician group, hospital inpatient, or hospital outpatient). In some embodiments, the methods, systems, and media herein report measure score to a health insurer or an interested party on behalf of the reporting entity. In some embodiments, the methods, systems, and media herein provide detailed feedback to reporting entity to drive quality improvement. In some embodiments, the methods, systems, and media herein support conversion of DICOM metadata after ingestion. In some embodiments, the methods, systems, and media herein support for conversion of HL7 messages after ingestion. In some embodiments, the methods, systems, and media herein support for direct mapping of the contents of one data field to another. In some embodiments, the methods, systems, and media herein support for basic text conversions such as adding prefixes or suffixes, changing text case, etc. In some embodiments, the methods, systems, and media herein support for the application of regular expressions for more complex text conversions.

In some embodiments, the methods, systems, and media are capable of receiving radiation measures and noise quantities in R Language, ETL, DICOM format, C++, Rust, handwritten code, or any combination thereof. In some embodiments, the methods, systems, and media are capable of receiving radiation measures and noise quantities in batch from data captured in tabular format by the edge devices used in the creation of the measure. In some embodiments, the methods, systems, and media are capable of receiving radiation measures and noise quantities that have been aggregated and processed as dataframes. In some embodiments, the methods, systems, and media perform event-based data processing, which is the requirement for processing incoming studies in near real-time. In some embodiments, the methods, systems, and media are capable of receiving radiation measures and noise quantities from two code repositories. In some embodiments, the methods, systems, and media perform data anonymization soon after ingestion. In some embodiments, the methods, systems, and media herein perform a separation of two or more codebases into their component modules based on functionality. In some embodiments, the methods, systems, and media herein extract out code that is not relevant (DICOM ingestion, anonymization). In some embodiments, the methods, systems, and media translate the code directly to Python, keeping the dataframe approach intact, to guarantee compatibility with the same datasets and in the same way as the R code, thus ensuring equivalency. In some embodiments, the methods, systems, and media modify the code to act on individual studies, receiving the necessary data inputs as parameters to independent functions. In some embodiments, all of the data cleaning and data quality functionality that was previously performed as a tabular dataset had to be incorporated into these functions. In some embodiments, the methods, systems, and media herein convert these functions that were converted to data pipeline flows managed by the data orchestrator component in the gateway edge system code, to be able to properly track, retry and cancel these study-based ETL tasks.

Integrating a data and task orchestrator into the gateway edge system may allow for accommodation of many different data-driven workflows. The gateway may comprise modular components that can be combined and sequenced to form various pipelines allowing for flexibility for various applications. The orchestrator may act as a data processor and router of data. The orchestrator may allow a full extraction, transfer, and loading of tasks into the gateway edge system. These tasks may be ETL tasks. The orchestrator may be a sophisticated, self-contained data pipeline at the edge that can be centrally controlled. In some embodiments, the orchestrator may utilize machine learning or large language models (LLMs) to automate interoperability or the ETL tasks. For instance, ML models or LLMs may be employed to automatically identify a pipeline of operations based on a processing of the input data and/or determine where the data is routed based on the input data and/or a request.

In an aspect of the present disclosure, a flexible data-driven gateway edge system for healthcare application is provided. The gateway edge system may comprise: a data and task orchestration engine comprising a plurality of modules, and the data and task orchestration engine is configured to i) receive an input data via a local network of a health system, ii) selecting a subset of modules from the plurality of modules and sequencing the subset of modules to form a pipeline based at least in part on a type of the input data and a workflow, and iii) processing, using the pipeline, the input data and routing an output to one or more entities in communication with the flexible data-driven gateway edge system. The output may comprise deidentified data. For example, the output may be image data or diagnostic data that is desired by a technology vendor without patient information (e.g., identity information). In some cases, the output may comprise completely anonymized data such as binary results of a quality measure.

The anonymized data may be requested by a third-party for various purposes (e.g., training data for training a third-party ML model, for research, etc.). The flexible data-driven gateway is deployed to a health system and is deployed within a firewall of a health system. In some embodiments, the sequence of modules comprises the translation engine and the quality measure computation component. In some cases, the sequence of modules further comprises an ingestion module and a transmission module. In some cases, the sequence of modules further comprise a machine-learning based module.

The orchestration engine herein may be implemented using any suitable workflow management tool to orchestrate data stacks by building, running, and monitoring data pipelines.

In some cases, the orchestration engine including a sequence of modules (e.g., subset of modules selected and arranged in a desired sequence) may be packaged within the provisioned gateway onsite. The orchestration engine may allow for the sequencing of modules that perform specific tasks. These modules may be sequenced in any order to create a desired outcome. Modules may be related to a number of different functions, including security, ingestion, deidentification, machine learning, efficiency, or clinical findings.

Figure 5:
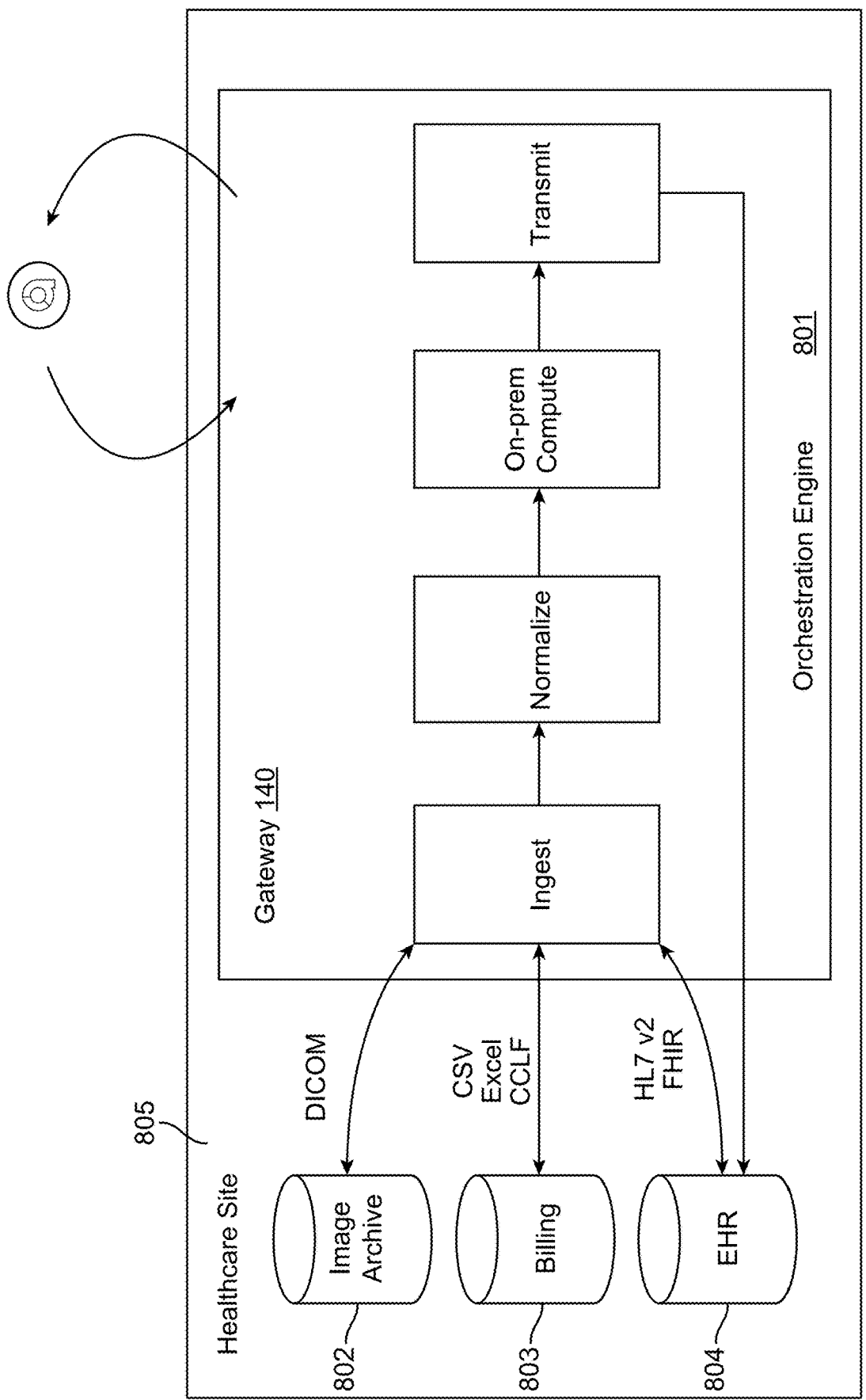
FIG. 5 shows a non-limiting example of the use of an orchestration engine to ingest, normalize, on-prem compute, and transmit data, in accordance with some embodiments.

FIG. 5 shows an example of various modular steps used with an orchestration engine. In this example, image archive systems 802, billing systems 803 and EHR systems 804 may transmit data from the healthcare site 805 into the gateway 140. Image archive data may be transmitted in DICOM format. Billing data may be transmitted in tabular (CSV) format, Excel, or CCLF format. EHR data may be transmitted in HL7 v2 or FHIR format. As shown in the example, the gateway may use the orchestration engine 801 to ingest, normalize, on-prem compute, and transmit this data. Other pipelines or sequences of modules may be created and used by the orchestration engine according to different applications and/or deployment environment. In some cases, the orchestration engine may further provide a real-time, unified interface that allow users to track state updates and logs, begin new runs and capture critical information whenever required.

The combination of the IoT approach and the task orchestrator, together with comprehensive interoperability options, may allow for many novel opportunities in healthcare such as edge compute (e.g., computation without patient data leaving the health system firewall), machine learning at the edge, federated learning, and/or machine learning (ML) training pipelines. Generally, a performance of machine learning algorithm trained model is only as good as the training of the machine learning model. A big part of the success of the ML pipeline may be data access and the data orchestration and processing that comes before the ML, i.e., input data to the ML pipeline.

The gateway edge system infrastructure here may support any ML algorithm execution. For example, various ML-based processing and functions may be executed in the gateway edge system such as ML-based medical imaging applications, identifying a nodule on a breast imaging exam, identifying a tumor in a lung CT, identifying the location of a stroke in the brain, triaging patients to the proper machines in an emergency department, improving the image quality of a scan, reading radiology reports to check it has what is needed for reimbursement, doing ML to make sure reimbursement codes are proper, identifying patients for clinical trials, identifying patients who need follow up, and more.

In an aspect of the present disclosure, a gateway edge system for healthcare application is provided. The gateway edge system comprises: a quality measure component comprising a translation engine configured to receive an input data from a health system, process the input data to extract a plurality of elements, and translate the plurality of elements into a plurality of variables, and a quality measure computation component configured to compute, based at least in part on the plurality of variables, a quality measure indicative of whether a radiation dose is (1) excessive (2) within a safe range or (3) inadequate. The gateway edge system further comprises a data orchestration engine comprising a sequence of modules to receive and process the input data according to a workflow and transmit a processed data to one or more entities in communication with the gateway edge system. The processed data comprise the quality measure. The gateway edge system is deployed within the health system.

In some embodiments, the input data comprises electronic health record (EHR) data and data from a radiology electronic clinical data system. In some cases, the radiology electronic clinical data system comprises Radiological Information System (RIS) or Picture Archiving and Communication System (PACS). In some embodiments, the plurality of elements extracted from the input data comprise a radiation dose, or an image pixel data.

In some embodiments, the plurality of intermediate variables may comprise a computed tomography (CT) category, a size-adjusted radiation dose, and an image quality metric. The methods, systems, and media herein enable secure and accurate translation of radiology pixel and radiation dose data into variables that can be ingested and used in an eCQM to calculate the CT category and primary DICOM data to calculate patient size-adjusted radiation dose and image noise. Reporting entities and their vendors may use these newly created data elements to calculate the eCQM and to submit results to any third party. FIG. 1 shows an exemplary method wherein scan data 151 generated and stored in respective data systems (EHR, RIS, PACS), billing data 152, and images 153 are provided from a healthcare site 150 to an injection, metadata, extraction, and normalization module 141 within a gateway 140. Imaging and scanning schedule data is then sent to a variable pre-processing module 142, wherein a scan category (e.g., single-phase, double-phase, triple-phase) 143, a noise quantity 144, and a size-based dose 145 are extracted and transmitted for eCQM computation 146, which integrates the translated data elements and calculates the measure result for each exam. In some embodiments, as shown, an Internet of Medical Things (IoMT) core 147 transmits data to an IoMT module 115 in a cloud categorization and characterization System 110. In some embodiments, the cloud categorization and characterization System 110 comprises an analytics module 111, a machine learning module 112, a reporting module 113, an image repository 114, and a healthcare data warehouse 116. As shown, in some embodiments, the analytics module 111 communicates with a client 120, wherein the reporting module provides aggregated measure results to a third party 130.

For measure calculations, data must be pulled from a variety of electronic sources. While most healthcare specialties and measures use only one data system (the EHR), radiology is unique in its reliance on the following: the EHR for patient and billing data, the RIS for operations data, and the PACS for image and radiation dose data. While vendors may differ, RIS and PACS systems are used in virtually all radiology practices. These three systems, however, often do not communicate with one another, making the ability to readily surface the right clinical information at the right time a significant challenge. Provided herein are systems, methods, and media that access, ingest, combine, and normalize data across these three systems in real time.

In some embodiments, a flexible gateway system here may be capable to work with a diverse set of EHR, RIS, and PACS systems by leveraging the Fast Healthcare Interoperability Resources (FHIR) standard.

In some embodiments, the measure combines data from the EHR, RIS, and PACS, allowing accurate determination of the reason for the study (CT category) based on the ICD-10 and CPT codes. It is the linkage of these historically disconnected databases that permits assignment of each exam to a CT category with dose and image quality standards specific to the anatomical region and clinical indication for the test.

Internet of Medical Things (IoMT)

Modem techniques are required to deploy and maintain thousands of gateway edge systems across U.S. health systems. IoMT is an approach that represents an advance in radiology data integration. This novel technology approach was chosen to enhance the security, accuracy, accessibility, burden reduction, and customized feedback associated with appropriate dose reduction. The IoMT implemented by the systems, methods, and media herein supports an important transition to more modem, cloud-native technologies as a software "gateway" that sits between medical sites and cloud storage providers. The software product can also be secured, maintained, and remotely updated by IT experts, with additional functionality sent to sites in real time to support new advances in radiology patient care. The software has the capacity to host various software products. IoMT refers to a large collection of locally installed software applications that securely communicate over the internet to allow robust remote management and monitoring of deployed software devices. IoMT may also allow rapid and flexible transmission and analysis of medical data.

The IoMT approach may enhance security, as protected health information (PHI) does not need to leave the health system network. The IoMT approach may also support greater accuracy, as data elements may be standardized and harmonized at the source of the data, with the possibility of querying local data systems dynamically for more robust data harmonization. The IoMT approach may also increase access to novel technology, as software advances can be pushed to health systems without requiring local IT experts to support advances in patient care. Additionally, the software may deliver customized performance feedback, for example, radiation dose reduction. With the capacity to host various software products, the IoMT approach may support a transition to more modem, cloud-native technologies.

The gateway edge system described herein is designed for nationwide dissemination through the IoMT approach. The gateway edge system may be secured, maintained, and remotely updated by experts. Additional functionality may be pushed to sites through remote upgrades to support patient care advances. The gateway edge system described herein may adhere to HIPAA, SOC2, and HITRUST certification by a third-party auditor. The gateway edge system may have the capacity to assemble and transfer EHR and imaging data from inside an organization's firewall to the cloud. The gateway edge system is a software system design that may enable complex edge-to-cloud medical imaging data workflows and edge computation. The gateway edge system has been developed to accommodate multiple use cases, including quality measure compliance and bi-directional edge-to-cloud data transfer. The gateway edge system may have advanced data orchestration capabilities, centralized deployment and management, and use of cloud-native technologies to maximize ease of use, security, and flexibility in supporting multiple enterprise radiology workflows. The gateway edge system may have easy self-deployment, a modem IoMT architecture that eliminates VPN access that can be risky, centralized management, continuous monitoring, strict, transparent security, and visibility into data flows and routing. The gateway edge system and its cloud management infrastructure have been HIPAA, SOC2, and HITRUST certified by independent auditors and passed rigorous security penetration testing.

Inbound interoperability by the gateway edge system may support incoming HL7 messages, FHIR API client for data retrieval, FHIR server capabilities for receiving resources directly, DICOM store capabilities, and filesystem access for tabular data. Outbound capabilities may include local DICOM routing, multi-cloud object storage, ingestion of data to managed medical imaging cloud services, and filesystem access to deposit the resulting artifacts of gateway edge system computation.

The gateway edge system may process medical images or perform medical image processing in real time, performing data normalization and enrichment by accessing additional data sources, and generating relevant outputs for the selected use case. The developed modules may take advantage of the IoMT-based central code deployment capabilities for easy deployment and updating of software modules across multiple gateway edge systems. The modules may also have important capabilities such as versioning, rollback, and monitoring.

Providing audits and feedback to imaging facilities with benchmarks on how their radiation levels compare with peers can elicit appropriate and sustained dose reduction. The scope, content, and format of the feedback mechanisms developed in this application may reflect substantial advancements over the preliminary, manually generated feedback used in the randomized trial described previously.

Gateway Data Management

The gateway can access, link, calculate, and report data to a secure, cloud-based data warehouse for analytics, reporting, and feedback. Designed with flexibility in mind, the software can access data using a range of protocols and data formats, including DICOM, DICOM Web Services (DICOMweb™), FHIR, Health Level 7 (HL7, HL7 v2.x) feeds, and tabular data dumps. Once ingested, the data can be normalized by mapping to the FHIR data model. As an example, FHIR may be chosen to normalize data across diverse EHR vendors. The gateway is designed to be deployed on a small server or virtual machine at imaging facilities or hospitals. The gateway can draw in data and calculate variables with no impact to provider workflow. The software can be fully integrated into existing quality measure data flows using QDM (quality data model) or FHIR, thus minimizing site reporting burden. Once connected to EHR, RIS and PACS, gateways can calculate variables without traversing the health system firewall.

Customized, near real-time feedback can also be generated through a variety of interactive charts and tables for users to improve performance.

DICOM and HL7 are the most widespread medical data standards, in part due to decades of use. They are extensive standards, encompassing both data structure and format. Their relationship with real-world entities and activities, as well as networking and messaging protocol specifications, makes them ubiquitous in medical informatics. As with many such standards, DICOM and HL7 have been designed to be flexible in their implementation to maximize adoption and accommodate varied scenarios, with validation and enforcement of the specifics left to the implementer.

One drawback of this flexibility is the significant variability in the way these standards are applied across institutions and healthcare software systems. It is not uncommon to find implementations that don't follow standard guidelines (e.g. saving the patient's ethnicity in the DICOM metadata 'Patient Comments' attribute instead of the more appropriate 'Ethnic Group' attribute). These irregularities can be due to system misconfigurations, system limitations that cannot accommodate the proper attribute, site-specific business logic constraints, or lack of knowledge of the existence of a particular data field. One consequence of this variability is that integrations between healthcare systems that rely on these standards are not guaranteed to work properly "out-of-the-box", since the receiving system might be expecting data elements in one location of the metadata stream, while the transmitting system may have that element saved in an unexpected location, or in a different format.

This is a well-known problem in healthcare system integrations and is typically handled by providing a conversion layer for the data that resides between systems. Although many conversions are simple mappings, some are complex, requiring more detailed logical operations and loops requiring custom programming. The gateway edge system may be able to ingest HL7 messages and may perform sophisticated conversions before routing or saving the contents to the database. Similar capabilities may also exist for DICOM image data.

Provided herein are Graphical User Interfaces (GUI) for the creation and management of data conversions. The GUI may allow a site administrator to create, edit, and delete conversions with the GUI in a management console. The functionality of a user-friendly GUI may provide users the ability to handle a large percentage of conversion requirements in HL7 and DICOM metadata and may allow for a "self-service" model of healthcare systems integration with the systems, methods, and media herein. This is important because of the number of physicians and hospitals that may need to use the software. This GUI may enhance user experience and accelerate implementation, reducing burden on health system personnel.

In some embodiments, the methods, systems, and media herein predict outcomes using machine learning and other techniques and a software module to provide customized, real-time feedback to users, including interactive charts and visualizations and comparative benchmarking to peer sites. The methods, systems, and media herein may deploy secure, remotely managed, scalable, edge-to-cloud software to generate feedback to guide specific, targeted, impactful improvements in patient safety.

In some embodiments, the methods, systems, and media herein deliver intuitive, homogeneous visualizations. In some embodiments, the methods, systems, and media herein offer sophisticated data interactions such as aggregations, pivot tables, synchronized charts, common filtering, and saved views to simplify exploratory data analyses, and are embedded in the analytics application along with insights that can be gleaned from each example.

Health care providers may comprise, without limitation, doctors, hospitals, radiologists, technologists, medical physicists, and quality reporting administrators who may be recruited to use these dashboards and provide user experience feedback. Secure application linked to patient clinical records are used for customized, filterable, sortable, and exportable graphs and tables reflecting site measure performance and receipt of user feedback on software.

Enhancing Gateway Edge System to Support Research-as-a-Service

Despite the rapid evolution of cloud-native technologies and artificial intelligence tools, research and technological advancement in radiology and other medical fields have frequently been hindered by lack of access to multi-site, comprehensive, longitudinal patient data for a number of reasons. First, large sample sizes are frequently needed for many research questions. It may be difficult and expensive to access and combine patient data across multiple health systems. Second, health systems may not capture important patient outcomes of interest to potential future researchers, particularly if the research question concerns outcomes that may be delayed in time from the health care encounter. For example, cancers associated with an incidental nodule may occur several years after its identification, when the patient is no longer associated with the healthcare system where the nodule was first found. It can be challenging to follow patient outcomes many years after imaging or exposure to a medication or treatment. This may increase the cost and complexity of research. However, population-based registries, such as cancer registries, still exist. Third, data are fragmented, as medical records and imaging data live in siloed systems. Even when data are accessible, it may require rigorous harmonization.

The methods, systems, and media described herein may provide an enhanced gateway edge system, comprising a Research-as-a-Service (RaaS) module that would provide access to billions of data points to technology companies, regulatory bodies, and public health and academic researchers. This would enable powerful population-based research with real-world data. The enhanced gateway edge system may comprise a secure, combined hardware/software platform with cloud connectivity. This platform may perform healthcare data ingestion, linking, pre-processing, and/or analyses within a hospital's local environment, without the need for large amounts of protected patient data leaving the firewall.

The gateway edge system described elsewhere herein may be connected to the electronic health, radiology, and billing records of many inpatient hospitals, outpatient hospitals, emergency departments, and ambulatory imaging centers. The methods and systems described herein may harmonize and standardize important components of these electronic records, such as medical diagnoses and imaging data (including radiation doses, images, and exam type). This information may be used for the purpose of reporting.

An enhanced gateway edge system network may be used to quickly identify patients of interest. For example, large healthcare systems with patients distributed across many centers may be able to rapidly identify patients with rare cancers. Such patients may benefit from referral to a specialized center within their insurance provider network. Another possible use of an enhanced gateway edge system network may be increased inclusion of patients from marginalized groups that have been historically excluded from clinical trials. Such patients have often been excluded because centers that care for such populations have not had the resources for primary patient recruitment. An enhanced gateway edge system RaaS system may thus be able to lower the bar to many, particularly under-resourced, facilities to collaborate on research.

Health data from medical claims, EHRs, radiology, and data captured using digital tools may provide unique evidence regarding the safety and effectiveness of imaging, medication use, and other health care interventions using observational study designs. Given the scope of deployment, harnessing the vast clinical data connected by the gateway edge system may generate a longitudinal collection of evidence from everyday clinical practice. Real-world data can enhance what can be accomplished through conventional trials in a few ways. First, real-world data can extend follow-up data collection beyond trial completion, capturing additional patient outcomes. For example, with multi-cancer genetic screening tests, some patients may have a positive screen where no cancer is identified. In these cases, it is impossible to know whether the test is a false positive or correct, but the cancer is undetectable as yet. Following such patients could also quantify the full range of diagnostic testing that occurs following a positive screening test. Second, real-world evidence may better reflect the populations that would use a drug or device compared to the more limited population enrolled in clinical trials, who tend to be younger, more affluent, and have fewer comorbidities. There also may be a benefit to studying post-approval outcomes in real target populations.

The enhanced gateway edge system may decrease barriers to research by streamlining identification of collaborators, cutting cost to access data, and/or eliminating bespoke infrastructure that cannot scale. Large observational studies may take considerable time and resources to complete, particularly if patients are included across multiple sites. Investigators and research staff at each site must gain requisite approvals and develop protocols for patient recruitment, collection, and sharing of data. For example, with the Watch the Spot trial, a 26-center randomized controlled trial comparing two strategies for the surveillance of small pulmonary nodules, other than the assignment of each center to one of the two study arms, all research data came from routine clinical documentation, which was hand extracted by project staff at each site. Having an enhanced gateway edge system in place could have reduced study costs tremendously. A single approach to data collection, integration, harmonization, and data cleaning before data were submitted to the data coordinating center could have precluded the enormous time and effort spent in cleaning data and many cycles of quality-checking and correction that were carried out by the sites and the data coordinating center. This work could occur using harmonized data and automated quality checks in the enhanced gateway edge system. Users would still have to find research collaborators. However, the investment required for sites to participate could be more modest, as the gateway edge system may already be deployed.

The gateway edge system may ingest billing data, image data, indication data, operational data, or patient data. The gateway edge system may receive these raw data and translate them into structured data elements that are harmonized across all reporting entities. Future data elements that RaaS users would like to study may need to be standardized. Thousands of medical concepts and terms are already standardized through data standards such as HL7 and OMOP. The gateway edge system may additionally comprise a cloud application. This cloud application may collect a superset of data elements from the gateway edge system that are necessary to provide feedback and benchmarking. This may allow users to compare their performance of many additional metrics against their broader organization as well as other sites. Since the gateway edge system can collect multiple metrics derived from the DICOM metadata, EHR data, and billing data, the cloud application can provide specific insights.

Figure 14:
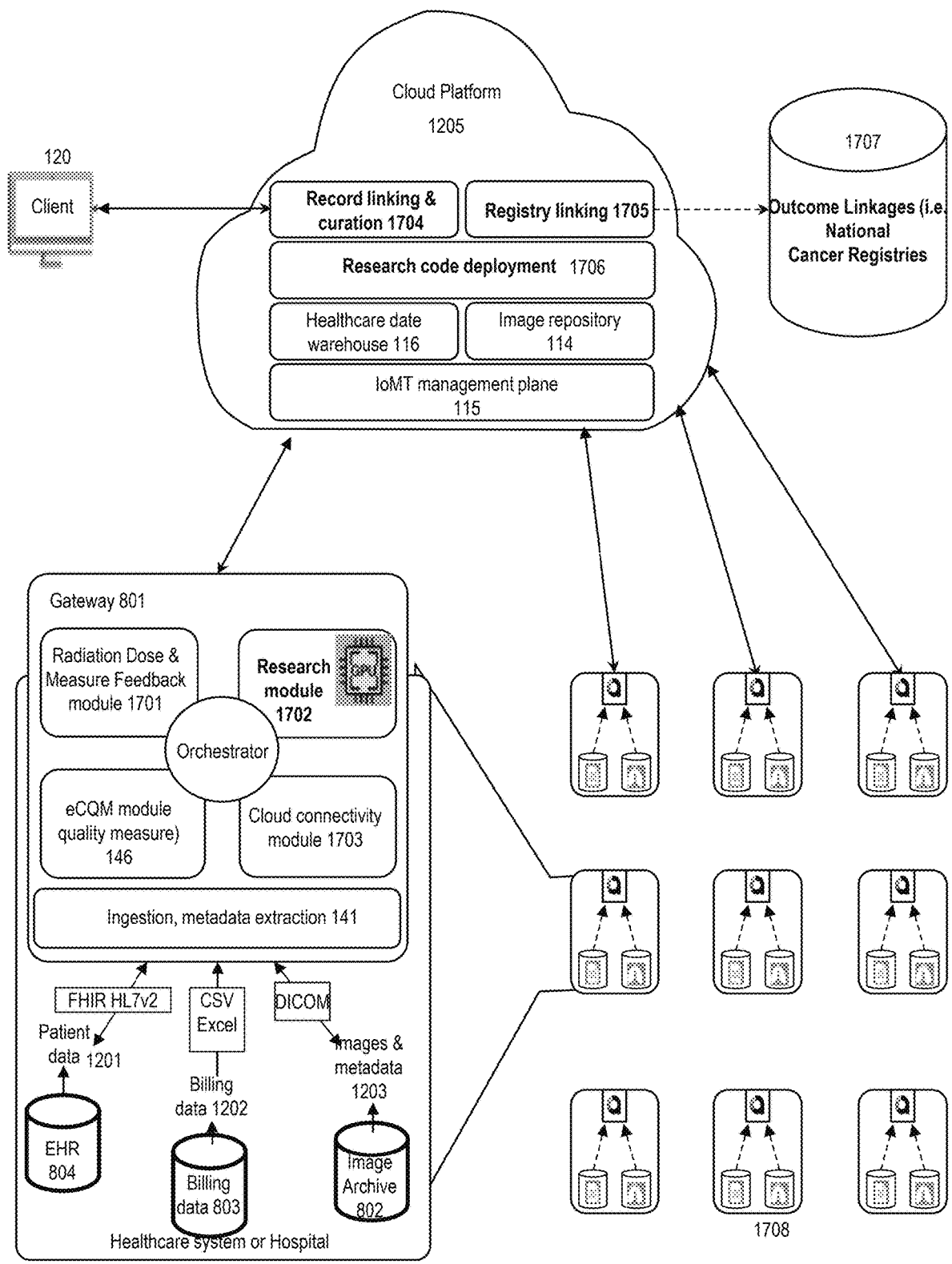
FIG. 14 illustrates the relationship between a healthcare system's electronic data sources and an enhanced gateway edge system as described herein, in accordance with some embodiments.

FIG. 14 illustrates the relationship between a healthcare system's electronic data sources and an enhanced gateway edge system as described herein. The enhanced gateway edge system may ingest and normalize data, so that on-premise computing of distributed programs can be run. Model outputs may be sent to the cloud system. For example, the gateway edge system may comprise a radiation dose and measure feedback module 1701, a research module 1702, an eCQM module 146, and a cloud connectivity module 1703. These modules may be connected by an orchestrator 801 as described herein. The gateway edge system may ingest and extract metadata from EHR systems 804, billing systems 803, and image archive systems 802, as described elsewhere herein. The gateway edge system may interface with a cloud platform 1205. The cloud platform may comprise record linking and curation 1704, registry linking 1705, research code deployment 1706, a healthcare data warehouse 116, an image repository 114, and an IoMT management plane 115. The cloud platform can interface with a client 120 or with outcome linkages 1707 (e.g., national cancer registries). The cloud platform 1205 can interact with multiple different gateway edge systems (miniature) 1708.

Figure 8:
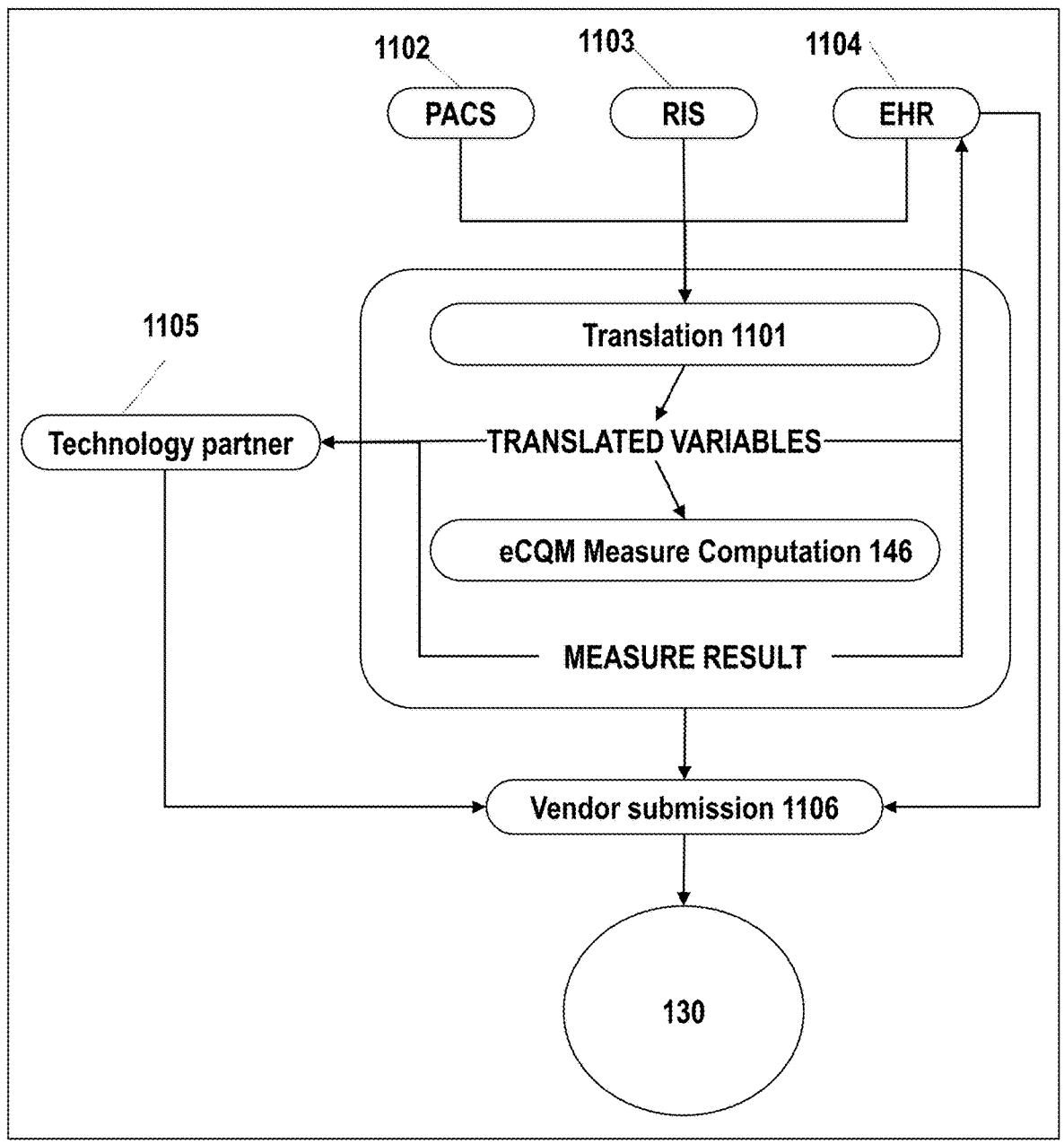
FIG. 8 shows a schematic of the translation system and measure computation for the methods, systems, and media described herein, in accordance with some embodiments.

FIG. 8 shows a schematic of the translation system and measure computation for the methods, systems, and media described herein. PACS 1102, RIS 1103, and EHR 1104 may all be input into the software described herein, which translates these inputs 1101 and computes an eCQM 146. These translated variables and results may be transmitted to a technology partner 1105 or submitted to a vendor 1106. The vendor can then submit the results to an interested party 130.

Figure 11:
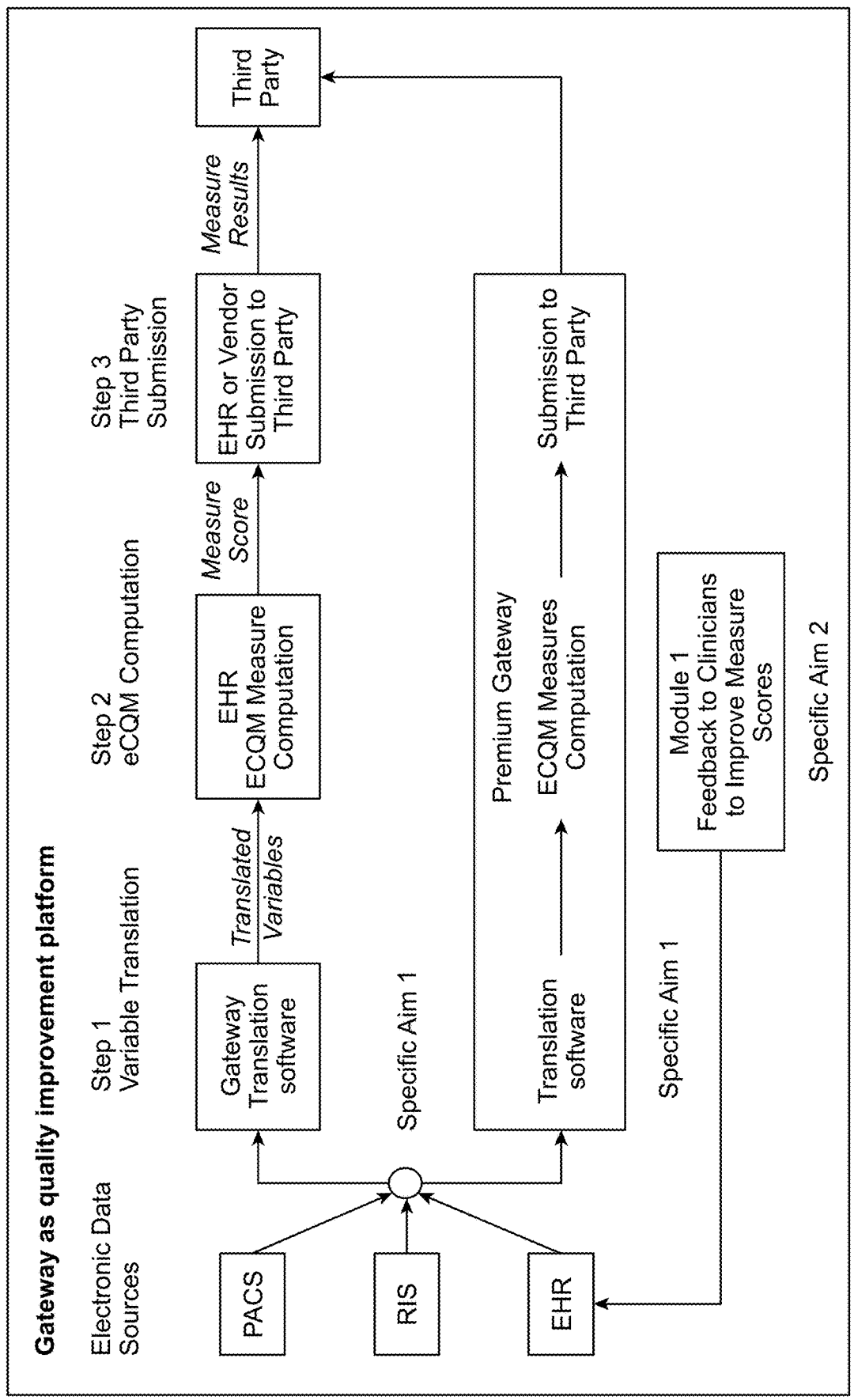
FIG. 11 shows a schematic of the relationship between the primary electronic data sources and the gateway, in accordance with some embodiments.

FIG. 11 shows a schematic of the relationship between the primary electronic data sources (in this case, PACS, RIS, and EHR) and the gateway. The gateway may include variable translation, eCQM computation, and submission, as well as a feedback module.

Figure 12:
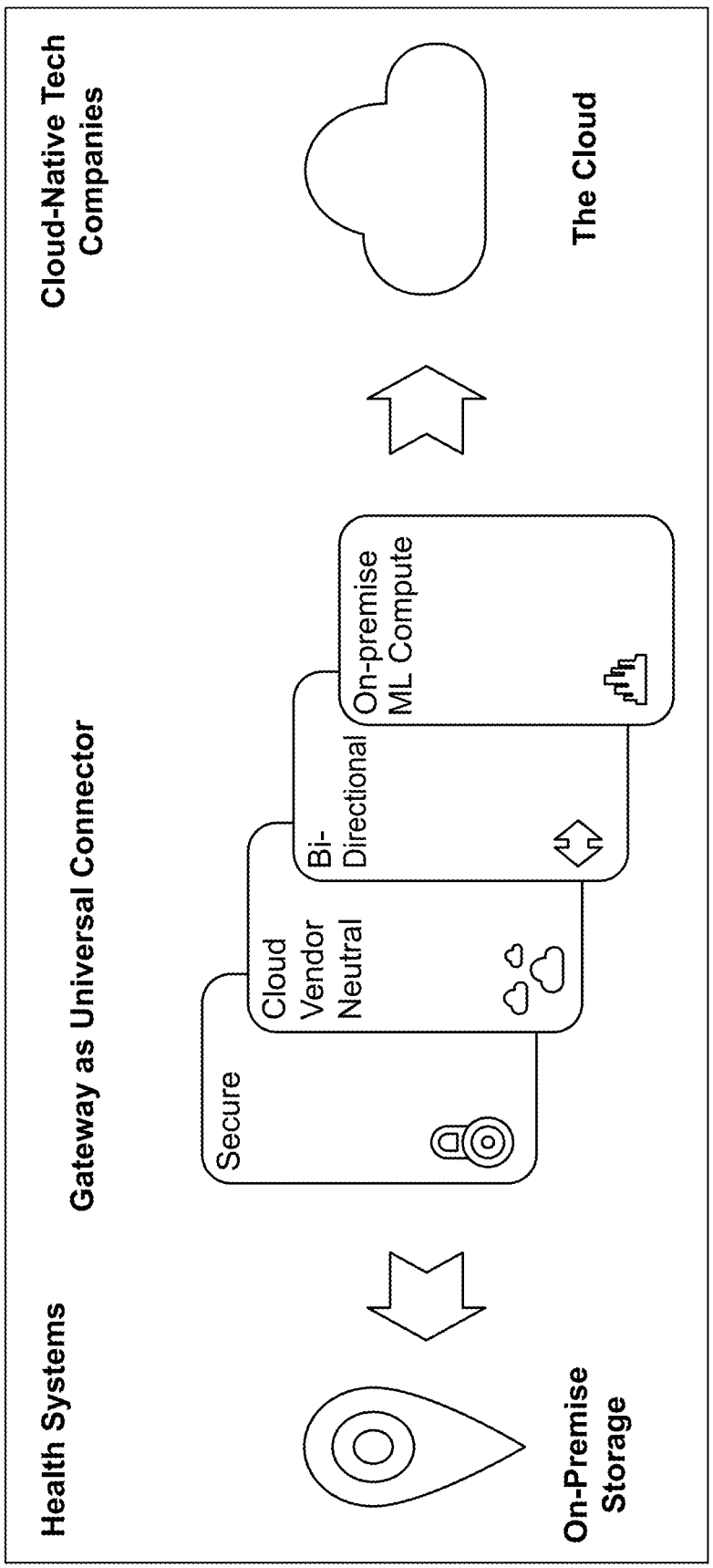
FIG. 12 shows that the gateway can be used as a universal connector, in accordance with some embodiments.

FIG. 12 shows that the gateway can be used as a universal connector. The gateway may be secure, cloud vendor neutral, bi-directional, and have an on-premise compute. It can interface between both the cloud and cloud-native tech companies as well as on-premise storage of health systems.

Figure 10:
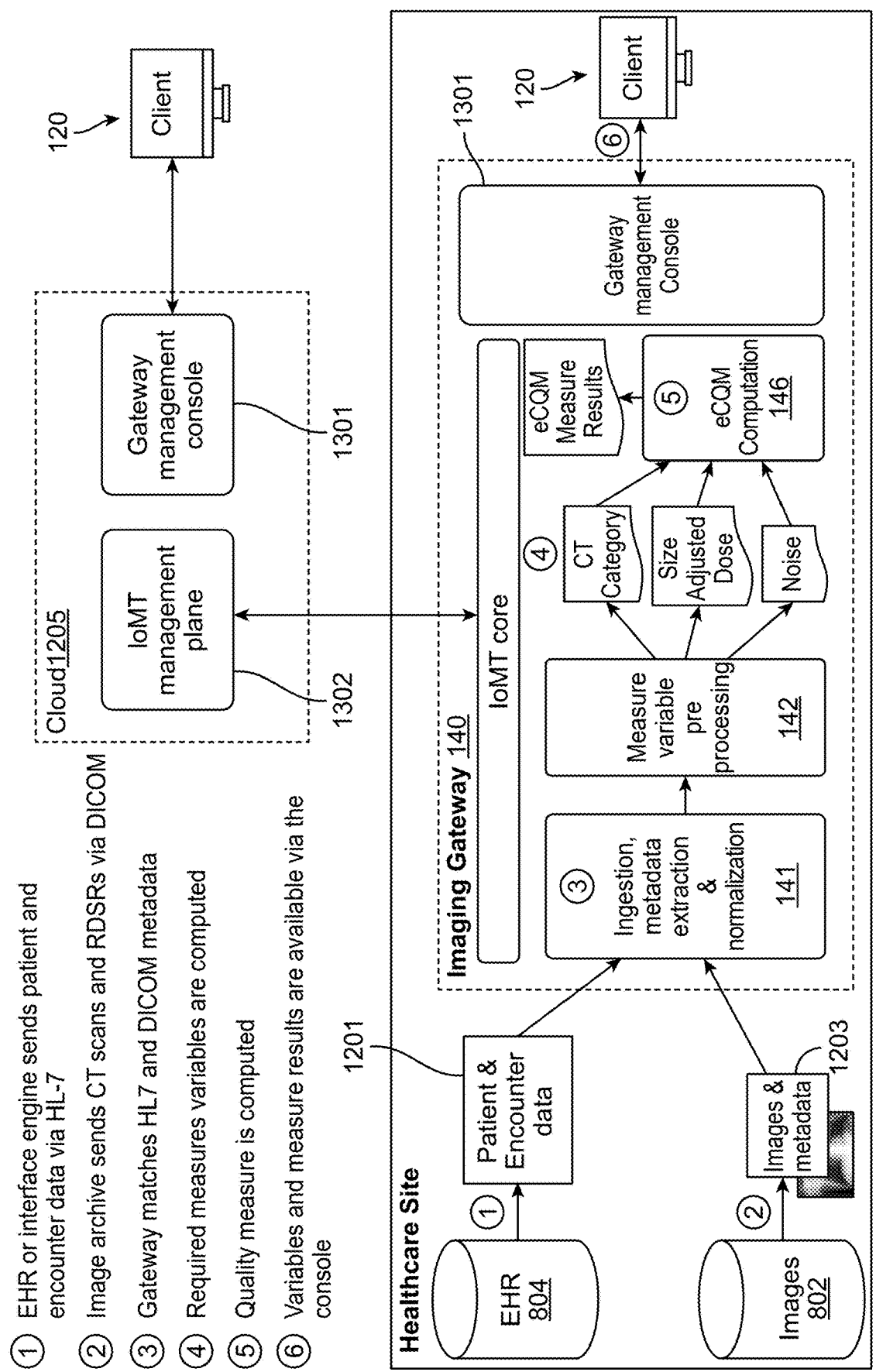
FIG. 10 shows a schematic of how the methods, systems, and media described herein may be deployable within a healthcare site's virtual infrastructure, in accordance with some embodiments.

FIG. 10 shows a schematic of how the methods, systems, and media described herein may be deployable within a healthcare site's virtual infrastructure. The gateway edge system may interface with EHR and PACS systems to receive and process the data necessary for computation of new electronic quality measures for radiology. First, the EHR or interface engine 804 may send patient and encounter data 1201 via HL-7. Second, the image archive 802 may send CT scans and RDSRs 1203 via DICOM. Third, the gateway edge system may match HL7 and DICOM metadata 141. Fourth, the required measure variables may be computed 142. Fifth, the quality measure may be computed 146. Sixth, the variables and measure results may be made available via the gateway management console 1301. The gateway may also comprise an IoMT core 147. The translation software may collect the data necessary to calculate three intermediate variables/categories, which may come from a combination of HL7 v2, FHIR, tabular, and DICOM sources depending on what is most easily accessible at each site. These intermediate categories may be CT dose and image quality, calculated CT size-adjusted dose, and calculated CT global noise. The gateway may interface with the cloud system 1205, which may comprise an IoMT management plane 1302 and the gateway management console 1301. The gateway management console can interface with the client 120.

The gateway edge system may comprise APIs and components for easy deployment. For example, the gateway edge system may have predefined clinical data endpoints for immediate connectivity. As described above, the gateway system here may be capable to work with a diverse set of EHR, RIS, and PACS systems by leveraging the Fast Healthcare Interoperability Resources (FHIR) standard. Health sites may connect and configure HL7 and DICOM for any available flow directly from the user interface described herein. The gateway edge system may support both DICOM DIMSE and DICOMWeb protocols. The recommended configuration may be for the local site to create a routing rule in their archive or DICOM router to send CT studies to the gateway edge system. An alternative configuration may be to have the gateway edge system perform query/retrieve from the archive based on the accession numbers received from RIS or EHR data. The gateway edge system may support industry standard HL7v2.x and HL7 FHIR messages to receive CPT and ICD codes. While HL7 integration may be preferred, alternative options including CSV files on shared network locations may also be supported. Tabular exports may be a non-preferred option, as this may require manual intervention and may not advance the objective of burden reduction.

Figure 9:
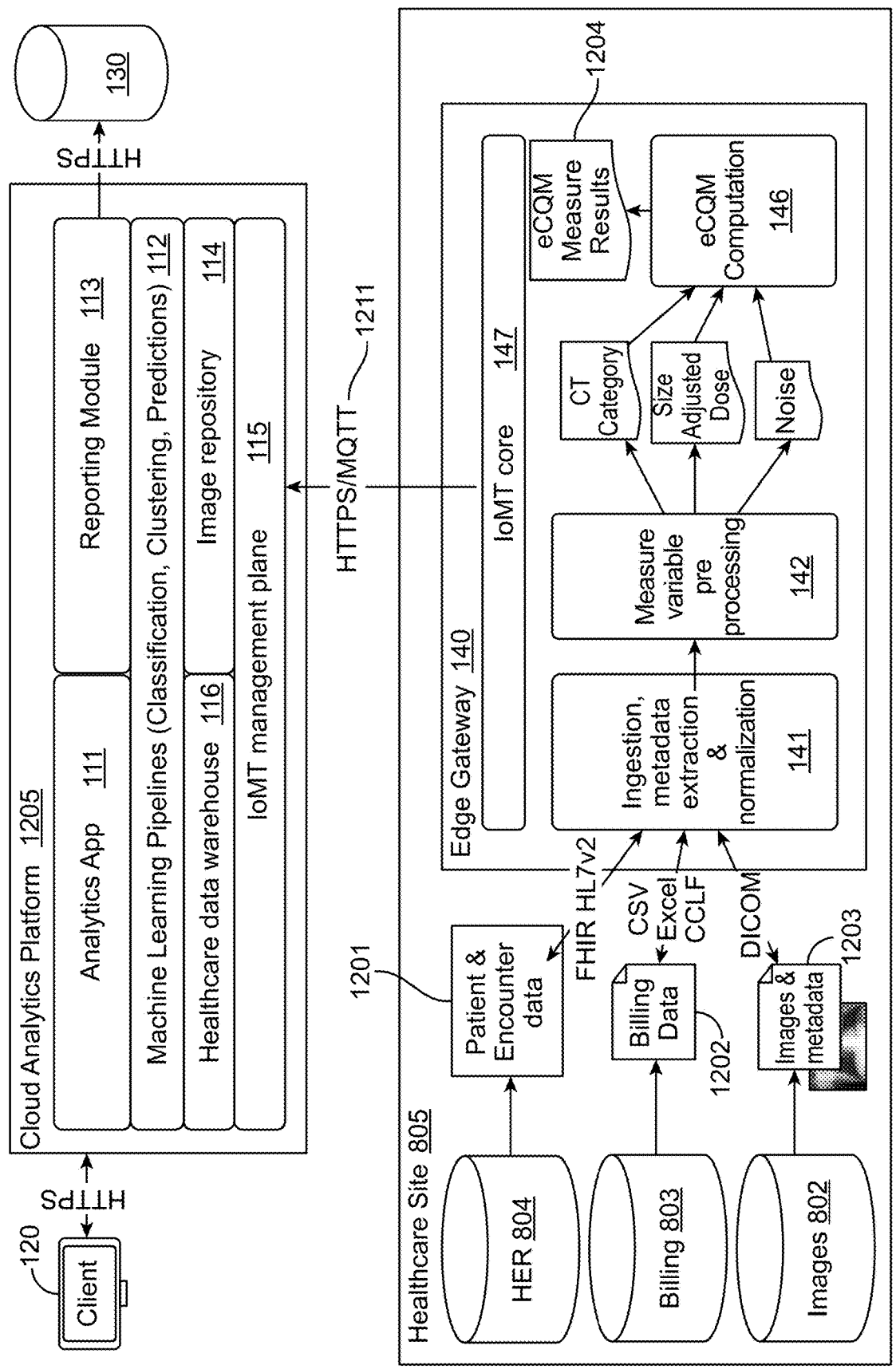
FIG. 9 shows a schematic of the architecture of the gateway edge system described herein, in accordance with some embodiments.

FIG. 9 shows a schematic of the architecture of the gateway edge system described herein. The gateway 140 at the healthcare site 805 may ingest data from multiple healthcare data systems, including EHR systems 804, billing systems 803, and imaging archives 802. EHR records may produce patient and encounter data 1201 in FHIR or HL7 v2 format. Billing records may produce billing data 1202 in CSV, Excel, or CCLF format. Imaging records may produce images and metadata 1203 in DICOM format. DICOM DIMSE or DICOMweb files may be used. Flat files may also be used. The gateway may perform ingestion, metadata extraction, and normalization 141. This may be followed by variable pre-processing 1204. The gateway may comprise a task orchestration engine 801, custom edge compute components, data transmission to a cloud data warehouse 116, and analytics/ML pipelines (111/112). The gateway may also comprise an IoMT core 147.

Also shown in FIG. 9 is a schematic of a cloud analytics platform 1205 that may be used in the gateway edge system described herein. The cloud analytics platform may comprise an analytics app 111, reporting module 113, machine learning pipelines (e.g., classification, clustering, predictions) 112, a healthcare data warehouse 116, an image repository 114, and/or one or more IoMT management plans 115. This cloud analytics platform can interface with the client 120 and/or a third-party 130. The cloud analytics platform can interface with the architecture at the healthcare site via a communication using secured messaging protocol such as HTTPS/MQTT.

In some embodiments, the output of the gateway may comprise completely anonymized data or comprise deidentification data. For example, the output may comprise anonymized binary results of an electronic clinical quality measure, anonymized image data, diagnostic data or other information generated by the data pipeline during the process (e.g., intermediate result) and/or the final output. For example, the Intermediate Variables and/or Calculated Measure can be exported from the Gateway Management user interface in a tabular (CSV) format to support calculation in the system of choice for the health system or provider organization.

Other systems may have difficult, bespoke, or lengthy processes to deploy and integrate. In these other systems, connectivity may be too restricted to allow fluid management by standard means. Keeping gateways properly secured in a timely manner may be difficult. Deploying new functionality may be challenging. Additionally, management of multiple gateways may require significant IT resources.

By contrast, the gateway edge system described herein may have standardized deployment architecture based on best practices. It may also have low burden implementation and security management. It also may be secure and compliant and built to meet the strictest site security requirements. It also may comprise cloud-native technologies. It also may have extensive and extensible connectivity with diverse healthcare IT systems. It may also have edge compute capabilities. It may also be robust, e.g., having self-healing and/or observability. It also may be flexible, e.g., easy to add and modify functionality. It also may be easy to manage at scale.

Multi-Tenancy Approach

The gateway edge system described herein may utilize a multi-tenancy approach. Multi-tenancy may be defined as the ability for a healthcare system to work and route data to many technology vendors through the gateway edge system, and the ability for one vendor to work and route data from many health systems through the gateway edge system. The gateway edge system may handle the complexity of the dataflows in the middle, creating a streamlined, single "pane of glass" through which data flows can be monitored. Multi-tenancy may simplify the number of connections that need to be created from a site perspective. It may also simplify deployment for vendors that want to take advantage of existing connectivity.

In an aspect, a method for on-boarding software-as-a-service (SaaS) in a health environment is provided. The method comprises: deploying a plurality of gateways to a plurality of health systems, where each gateway is deployed within a firewall of a respective health system; and displaying a pre-defined onboarding flow via a web-based portal for deploying the plurality of gateways, wherein the pre-defined onboarding flow comprises configuring each gateway and a pipeline to be deployed based on a user-selected workflow and wherein the web-based portal is provided by a cloud platform in remote communication with the plurality of gateways. In some embodiments, each gateway, at runtime, routes an output data to a plurality of entities. In some embodiments, the plurality of entities access the output data via a secure cloud credential.

Figure 7:
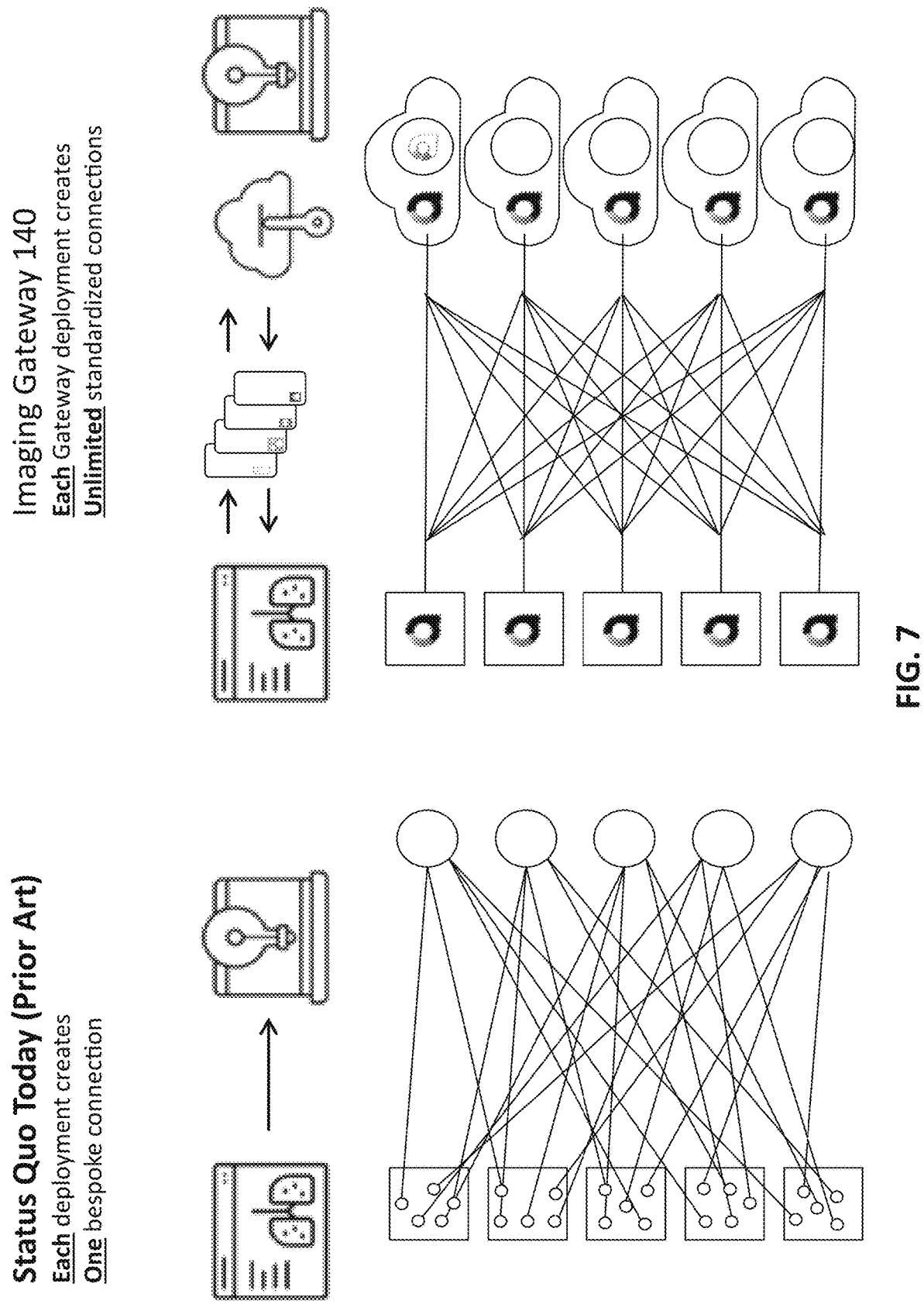
FIG. 7 illustrates the multi-tenancy approach, which may provide a technology-based competitive advantage with strong network effects, in accordance with some embodiments.

FIG. 7 is an illustration of the multi-tenancy approach, which may provide a technology-based competitive advantage with strong network effects. Healthcare systems may previously have had one bespoke connection between a health system (squares) and a technology company (circles) in each deployment. With the gateway edge system described herein, each gateway deployment creates unlimited standardized connections. For example, a healthcare system may have had 40 vendors with 40 gateways deployed in the medical imaging environment. This would be 40 attack surfaces for hackers to exploit. The gateway edge system described herein would be a single gateway that could be deployed and securely route data to the healthcare system's preferred vendors. The gateway edge system would have increased security and visibility given to health systems and vendors than in previously-implemented systems. Similarly, technology companies could provide their cloud credentials and receive data from many different health systems into a centralized location.

IoT Framework of the Medical Imaging Gateway and Cloud Gateway Management System Imaging gateway management can be cumbersome, with typically non-trivial implementation projects. A site's available IT personnel capacity and IT roadmap may need to be accounted or planned for. Multiple stakeholders may be involved, including radiology department IT and enterprise IT. Security and/or risk management may also need to be considered. An imaging gateway management system may also need integrations that can integrate PACS and/or EHR.

Many healthcare institutions are very strict about opening up their firewall. For example, SSH access is generally prohibited or severely restricted. Healthcare institutions may require VPN or similar technologies to connect from the outside. Additionally, healthcare institutions frequently have their own VPNs and won't allow others to access their institution. Sometimes, access may only be allowed via RDP, sometimes even supervised. Challenges to access can hinder proper security patching or timely response to CVEs.

Updates to software dependencies may require broader internet access, which can cause challenges and security concerns. Updates to application functionality may be challenging due to connectivity restrictions (e.g., restricted ports and/or whitelisted IPs) and/or heterogeneous host environments where the underlying host environment can't be depended on for software dependencies. It may be difficult to deploy new functionality or modules and/or difficult to roll back deployed functionality.

Observability in imaging gateways is frequently critical. Host metrics, application metrics, and/or application data may be monitored. A robust observability and control plane for both application and host OS are generally required.

The present disclosure may address the above-mentioned drawbacks by providing a cloud internet of things (IoT)-based framework for a health environment. The framework comprises: a gateway deployed to a health system, where the gateway is deployed within a firewall of a health system and wherein the gateway is configured to, at runtime, execute a containerized code within the gateway; and a cloud platform in remote communication with the gateway, where the cloud platform comprises a container registry comprising at least a container-wrapped code module, where the code module is tested for vulnerability and is in compliance with a wrapper application program interface (API) of the gateway.

In some embodiments, the container-wrapped code module is deployed to the gateway for execution. In some embodiments, the gateway is deployed in a virtual infrastructure of the health system and interfaces with one or more sources in the health system. In some cases, the gateway is within a local network of the health system and in communication with the one or more sources using interoperability protocols. In some cases, a communication protocol between the gateway and the cloud platform uses secured messaging MQTTS or HTTPS that is different from the interoperability protocols. The gateway can be the same as those described elsewhere herein. For instance, the gateway comprises an electronic clinical quality measure component configured to process an input medical image data and patient data to generate an electronic clinical quality measure indicative of whether a radiation dose for acquiring the medical image is (1) excessive (2) within a safe range or (3) inadequate.

The IoT approach in a gateway edge system may provide several benefits. First, an IoT approach may be designed for robust remote operation, deployments at scale, centralized remote management and control, and/or OTA updates/upgrade pushes. IoT systems also frequently have well-understood security paradigms. IoT systems may also have modest connectivity requirements, e.g., MQTT and HTTPS and limited/known external endpoints to be whitelisted.

In some embodiments, the communication 1211 between the cloud (e.g., cloud 1205 in FIG. 9) and medical imaging gateway (e.g., imaging gateway 140 in FIG. 9) deployed to the site may be established for management, module updates, security updates, issue resolution and telemetry collection. In some embodiments, telemetry collected by the gateway is limited to device operations, device resources, de-identified logging, and metrics. For example, the network connectivity 1211 may use secured messaging protocol such as MQTT or HTTPS.

The gateway and gateway management console may use cloud-native technologies that beneficially ensure increased ease of use, security and flexibility to support multiple radiology workflows.

Use of Enhanced Gateway Edge System for Radiology Research

The diagnostic radiology field suffers from a lack of high-quality evidence both for the utilization of tests/technologies and for how test findings are interpreted and managed. Both shortcomings have led to an expansion of low-value and potentially harmful patient care. The evidence underlying the use of imaging tests is based mainly on case series, observational, and diagnostic accuracy studies, and not on well-designed randomized trials or large cohort studies demonstrating improved patient outcomes. Such studies could be made less expensive and more efficient by an enhanced gateway edge system as described herein.

As for interpreting and managing findings (e.g., a lung nodule or pancreatic cyst), a lack of evidence on the risk of these findings may introduce uncertainty that frequently leads to potentially unnecessary and invasive diagnostic workup, treatment, and long-term surveillance. Cohort studies may be a favorable way to address this uncertainty and guide the interpretation of test results, where the most common concern is cancer. Retrospective cohort studies, which rely on existing data collected for routine care, can quantify the risk of important disease associated with imaging findings through linkage with population-based cancer registries or EHRs. For example, a nested case-control study evaluated the risk of ovarian cancer in 72,093 women based on ultrasound characteristics of ovarian masses. Ovarian cancers were identified by linkage to the local surveillance, epidemiology, and end results cancer registry. Full ultrasound examinations were reviewed for all women with cancer and a matched subset of those without cancer. Simple ovarian cysts, present in up to 24% of examinations, were not associated with cancer (absolute risk: 0-0.5 per 1000 women), and the authors concluded such findings could be safely ignored.

Figure 13:
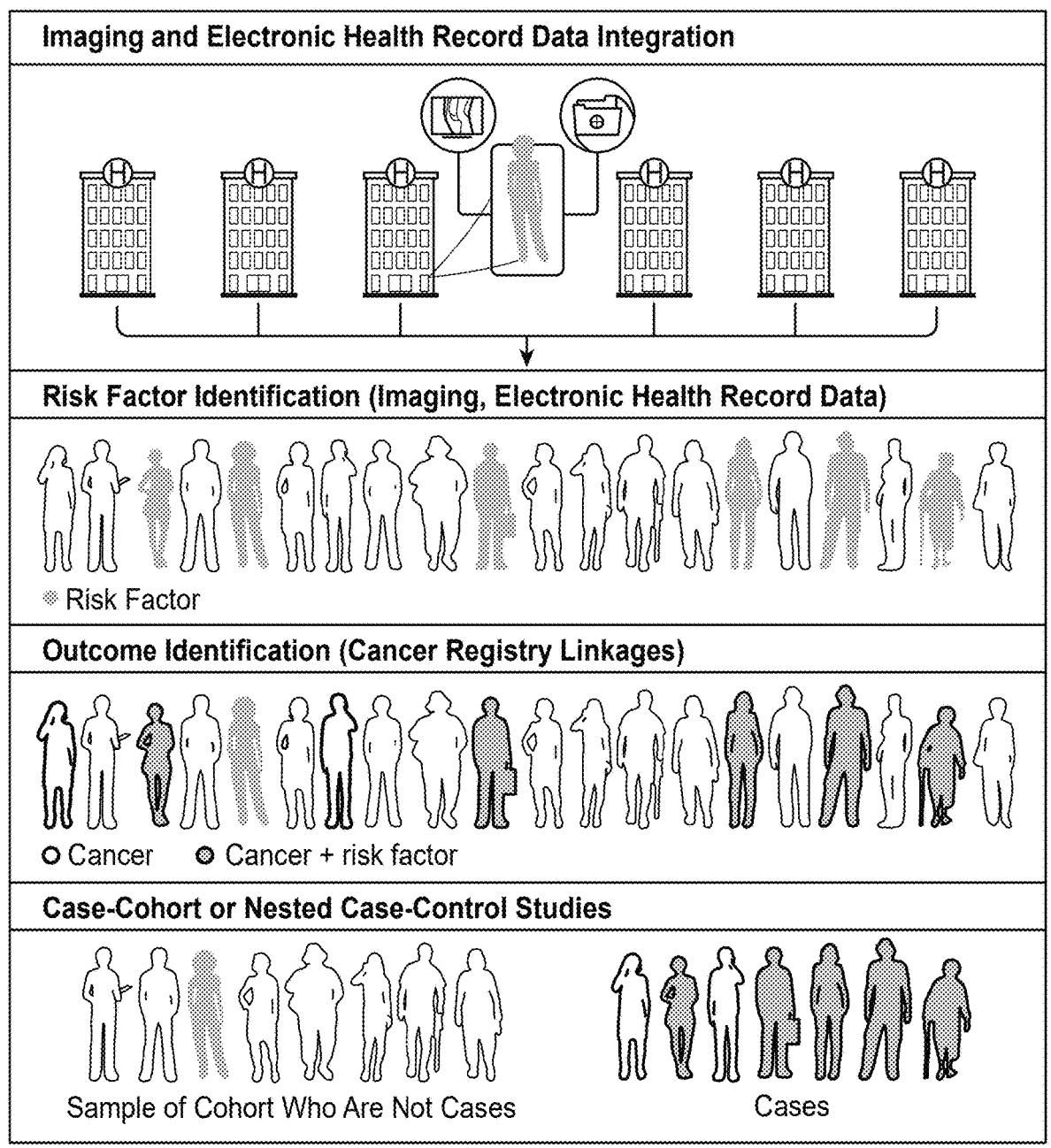
FIG. 13 illustrates how the enhanced gateway edge system described herein could facilitate the design of a large, multi-site study that could enable faster and simpler nested case-control and case-cohort studies to quantify the risk of cancer associated with specific imaging findings, in accordance with some embodiments.

The enhanced gateway edge system described herein may offer a powerful way to a mass datasets for these types of studies, as seen in FIG. 13. FIG. 13 illustrates how the enhanced gateway edge system described herein could facilitate the design of a large, multi-site study that could enable faster and simpler nested case-control and case-cohort studies to quantify the risk of cancer associated with specific imaging findings. In the first (top) row, imaging and clinical data from diverse health systems are shown being linked and pooled. The second row illustrates identification of risk factors in the data, such as pancreatic cysts, pulmonary nodules, or other imaging findings. In the third row, linkage with the national Virtual Pooled Registry—Cancer Linkage System to identify cancer cases within the cohort is shown. In the fourth (bottom) row, comparative analysis between cancer cases and a sample of the cohort who do not have cancer is shown. In this example, 5 of 7 patients with cancer possess the risk factor, compared to 1 of 8 controls without cancer.

In a distributed fashion across many sites, machine learning-based analytics could be run on radiology data within each facility's firewall to identify risk factors (e.g., the size and characteristics of thyroid nodules). The only data that may leave the hospital's firewall for such a study may be minimum necessary patient identifiers to link with critical outcome registries such as the national Virtual Pooled Registry-Cancer Linkage System for cancer outcome ascertainment. Though this transfer of patient data across the gateway edge system may require additional consideration and approval by participating sites, this may reduce the time, cost, and expertise required for these large-scale cohort studies. A single data linkage may determine outcomes on all patients, even if the patients were assembled from a thousand hospitals.

To support a Research-as-a-Service use case, the gateway edge system needs to be able to run code provided by the user, akin to an "app" model within a software platform. The gateway edge system may comprise architecture components that will allow that code to be run as containers within it. The gateway edge system may run these containers in isolation with protections against malicious software execution, while retaining the ability to send and receive data indirectly through the gateway edge system's standards-based interoperability protocols and APIs.

Use of Enhanced Gateway Edge System to Enable On-Premise Analytics

Healthcare organizations frequently have a strong preference to analyze data locally, rather than transferring it to the cloud, for reasons of security and data ownership. The enhanced gateway edge system may make on-premises data processing and analyses possible, without private health information leaving the facility's firewall. The capabilities of the enhanced gateway edge system may allow for versatile data processing and the application of machine learning models to local data by performing the machine learning inference at the edge, without the data leaving the healthcare site's firewall. This may have a number of benefits compared to pure cloud-based machine learning model inference, such as improved latency and reduced data movement costs. GPU-accelerated ML capabilities in an enhanced gateway edge system may also enable more sophisticated privacy-protecting machine learning approaches, such as federated learning. Federated learning may allow for models to be trained on sensitive patient data from multiple sites without the data leaving the healthcare site. Federated learning may do this by first training separate models at each hospital with the local data available, and then sending these models to a central server to be combined into a master model. As each hospital acquires more data over time, it can download the latest master model, update it with the new data, and send it back to the central server. Throughout the process, raw data is never exchanged or moved beyond the health system firewall. Only the models move through the health system firewall, and these models cannot be reverse-engineered to reveal the data.

Example: Prevalence of Incidental Findings

Advanced medical imaging with CT, ultrasound (US), and magnetic resonance imaging (MIR) offers powerful diagnostic tools that have revolutionized medicine by allowing rapid visualization and characterization of internal structures, enabling earlier detection and diagnosis of disease. However, as the precision of these technologies has improved, so has the likelihood that an incidental finding will be diagnosed in one of those examinations. Incidental findings, which are unrelated to the original reason for imaging, may include findings such as small lung, thyroid, pancreatic, liver, and renal masses detected in patients imaged for another purpose.

Incidental findings may appear in 15-40% of all advanced imaging exams. The risk of harboring significant or meaningful disease, particularly cancer, is generally considered low (<1%) for asymptomatic individuals. However, poorly characterized cancer risk and fear of ever missing cancer has resulted in a cascade of diagnostic evaluation and treatment and a large increase in the overdiagnosis of indolent disease that would never harm the patient, with little change in disease mortality. For example, follow-up imaging of incidentally detected thyroid nodules frequently leads to biopsy. This practice has become so routine that the incidence of thyroid cancer in the U.S. tripled between 1975-2009 with no changes in mortality rates (0.5 per 100,000). This was largely driven by the overdiagnosis of indolent papillary thyroid carcinoma). There is a large variation in clinical management of incidental findings due to the paucity of good evidence, which requires large, population-based cohort studies. The American College of Radiology (ACR) has provided algorithms for managing incidental findings. However, meaningful evidence on the risk of those findings, let alone outcomes or cost-effectiveness data to support most of the recommended algorithms, are further needed. The enhanced gateway edge system may be useful in generating a multi-site cohort of patients with nodules identified in radiology reports and images. A proof of concept use case may make use of multi-source data collection, custom research code deployment, pixel-based machine learning nodule detection, LLM-based nodule detection from narrative radiology reports, and cohort pooling and upload to the gateway edge system cloud platform for research. The multi-source approach may allow comparison of quality of diagnosis between the EHR problem list and imaging reports, as well as pixel-based AI in the case of lung nodules. This multi-source approach may support population-level research with a number of questions including prevalence and outcomes. The multi-source approach may also support the fidelity of record-keeping across institutions.

Two custom research modules may be deployed on the gateway edge system. First, a lung nodule detection module that can analyze the narrative and impression sections of free text-based radiology reports using a locally-deployed large language model (LLM) that uses GPU acceleration may be deployed. Second, a lung nodule detection module may be deployed that can analyze the pixel data of CT scans of the lung. This lung nodule detection module may use any suitable architecture for medical machine learning model development and deployment.

Streamlining Onboarding Process

The process of deploying gateway edge systems into healthcare sites may be streamlined to enable low-burden onboarding of radiology software. The security, legal, technical, and administrative steps to deploy gateway edge systems may be a significant barrier to the implementation of such types of projects. In addition to the technical innovations necessary for easy deployment and management of a gateway edge system, it is important to facilitate the non-software-specific process. The present disclosure provides an end-to-end gateway edge system onboarding experience utilizing a web-based portal that serves as a central platform for step-by-step guidance and communication around the different steps required for gateway edge system deployment across all parties and actors. The portal allows for pre-defined onboarding flows with different tasks for the gateway edge system developer and the client, including document review and signature for HIPAA Business Associate Agreements (BAA), Data Use Agreements (DUA), and privacy policies. The onboarding portal may also provide stepwise guidance for technical resources to deploy and configure the gateway edge system. The onboarding portal may act as a central communication node for providing support to clients during the onboarding process.

The onboarding experience may be a SaaS-based framework that may allow for multiple gateway deployment work streams to be executed in tandem through a web portal. In an example, a SaaS service for an interactive, dedicated portal may be used. The onboarding experience may allow for many steps to be done simultaneously by assigning the tasks out to many different stakeholders, with all data captured in a single location. Legal, technical, business agreements, and data agreements may all be able to be run at once. What may previously have taken 3 months to do may be accomplished in a matter of weeks, days, or in some cases, as little as one day.

Figure 6A:
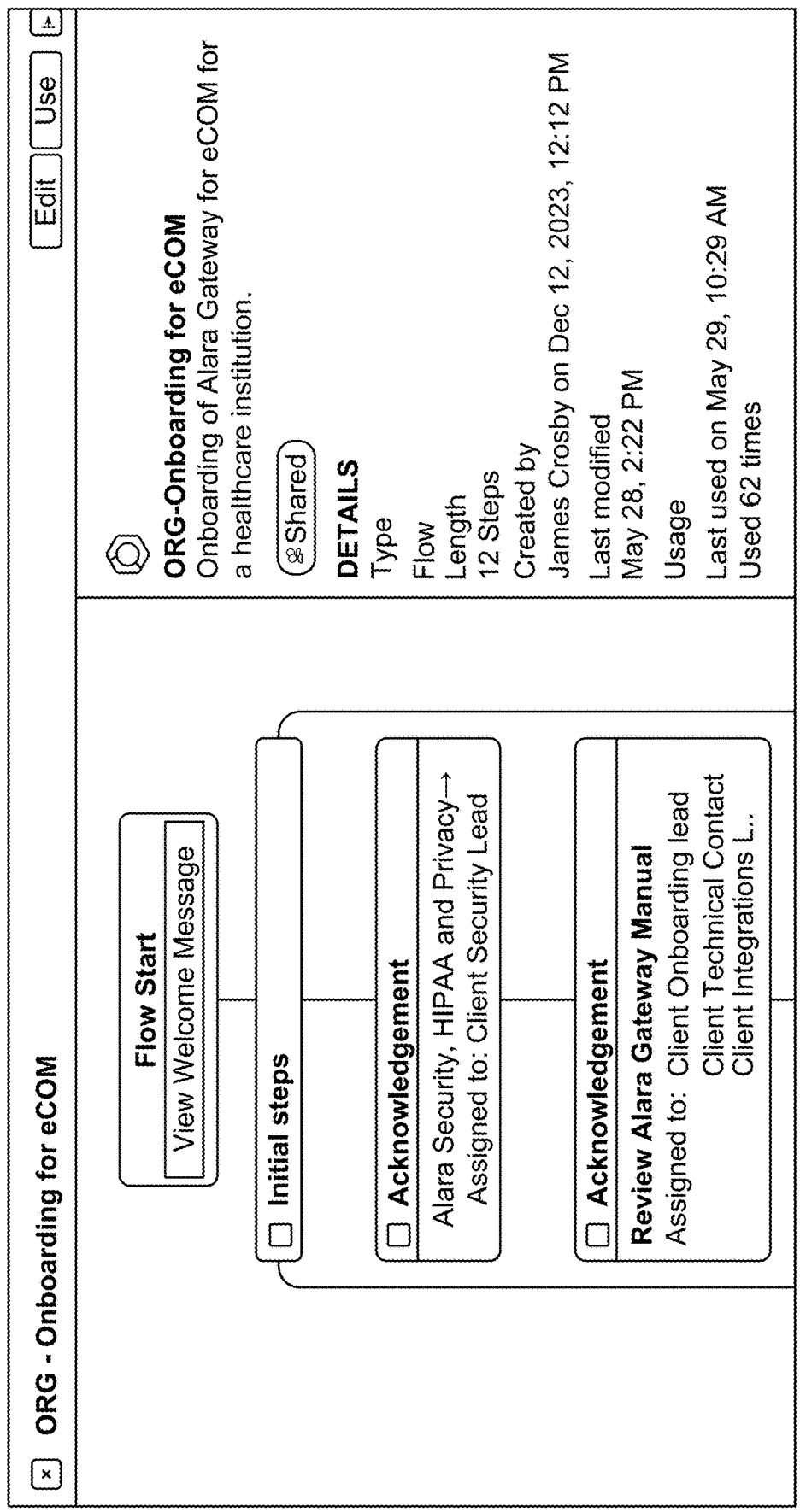
Figure 6B:
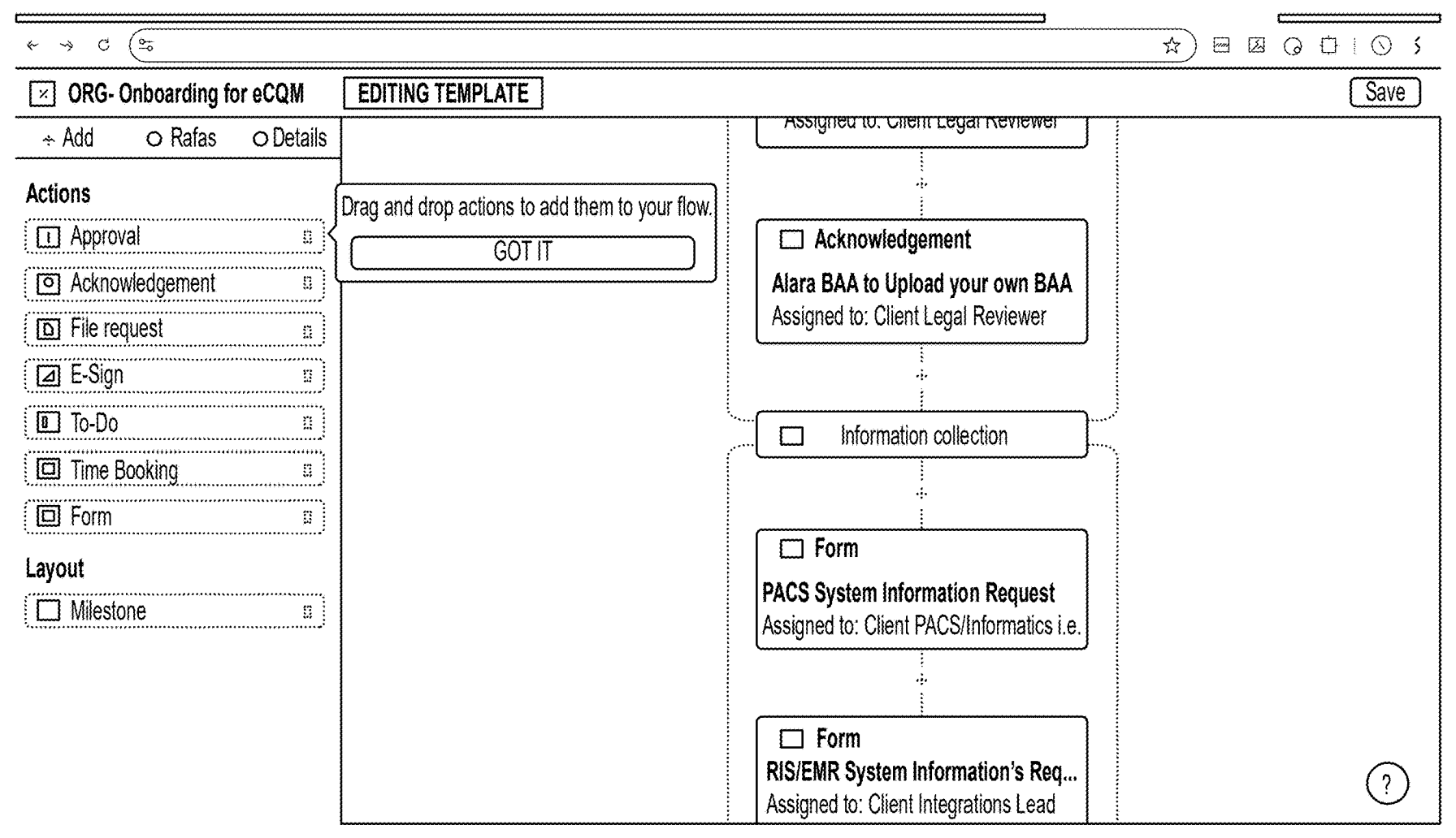

FIGS. 6A and 6B illustrate an example of an onboarding portal implemented in a platform allowing for templatizing an onboarding process. The onboarding portal may be an interactive, dedicated portal. The onboarding portal may be provided by a cloud management console herein. The onboarding portal can be remotely accessed via the cloud application or accessed in a computing system local to the healthcare organization. The workflow illustrated in FIG. 6A begins with a flow start, followed by initial steps, acknowledgement of security/HIPAA/privacy, followed by reviewing the gateway edge system manual. FIG. 6B illustrates the rest of the workflow. The next part of the workflow is an acknowledgment of the BAA (either a default BAA or a user-uploaded BAA), followed by information collection, a PACS system information request, and a RIS/EMR system information request.

In some cases, the onboarding or deployment may require signing into an account to gain access to the Gateway Management UI from where new gateway installations and deployments are launched. As illustrated in the example, a user may be prompted to name and create a new Gateway communicates back to the Cloud IoT infrastructure and prepares, or "Queues" the new installation. The Gateway installer is a simple two-step process. The workflow may comprise running an installer which may comprise a first step downloading packages using a curl command. As an example, the curl command can be copied and pasted into a command line. The second step is another command, which can also be copied and pasted, to start the Gateway services after the first step is completed. Once the installation is completed, the gateway can be configured via the management console.

As described elsewhere herein, the Medical Imaging Gateway has predefined clinical data endpoints for immediate connectivity. For example, a user may connect and configure HL7 and DICOM for any available flow directly from the Gateway Management UI. The Gateway Management Console menu is also accessible locally by navigating to the host instance' IP address in a browser. This information is provided in the terminal after successful completion of the second step in the process of running the installer. As an example, a user may choose to configure HL-7. The Gateway may implement an HL7 MLLP listener, which is used to collect required data points for the eCQM computations that are not available via DICOM. The HL7 Configuration is editable by selecting the HL7 Service. In another example, DICOM can be configured. The Gateway may implement a DICOM SCP using DIMSE protocol. Studies should be forwarded in their entirety to the gateway for use in available flows. For example, entities interested in eCQM calculation flows may forward all primary CT series and images contained within those series, plus Radiation Dose Structured Reports (RDSR) from a PACS or DICOM router to the gateway. The DICOM configuration is editable by selecting the DICOM Service. For instance, multiple DICOM nodes can be added to the same gateway. Adding a new DICOM node such as PACS or DICOM router requires input of the node name, AET, Host, and Port.

Incorporating Machine Learning Hardware and Workflows

The base architecture of the gateway edge system may be modified to support graphic processing units (GPUs). The gateway edge system may also incorporate frameworks and libraries required to execute resource-intensive machine learning tasks at the edge. The gateway edge system may support general matrix processing acceleration, which can be useful for many image processing pipelines. The gateway edge system may also support multi-modal ML inference and training, including privacy-enhancing federated learning scenarios.

Retrospective Data Collection and Processing Capabilities

The gateway edge system may process incoming data in near-real time (e.g., data "push" model), to support the use cases of measure computation, cloud upload and download, and data transfer to a cloud dose analytics application. The data processing flows may further comprise a "pull" model, where the gateway edge system itself can initiate the data pipeline by querying and retrieving the necessary data from the relevant healthcare information systems based on a set of criteria for cohort generation. This queried data can be newly created or historical data. Configurable data pipelines and APIs may provide a "wrapper" around custom research modules deployed in the gateway edge system. This may enable the gateway edge system to act upon the research module's specific data collection logic. This may also enable the gateway edge system to leverage the native interoperability capabilities of the gateway edge system.

The gateway edge system's data model, data tracking, and data retention capabilities may also be enhanced to support more comprehensive local data manipulation requirements of new multi-step data collection pipelines. This may allow for the retrieval of additional data elements as needed based on the results of initial cohort identifier lists, previous analysis, or filtering steps. Performance and scalability enhancements may be used to reliably accommodate for increased computational and storage requirements of more complex, retrospective, multi-step data pipelines for research.

Cloud Platform to Support RaaS

The present disclosure may address the above-mentioned drawbacks by providing a cloud internet of things (IoT)-based framework for a health environment. The framework comprises: a gateway deployed to a health system, where the gateway is deployed within a firewall of a health system and wherein the gateway is configured to, at runtime, execute a containerized code within the gateway; and a cloud platform in remote communication with the gateway, where the cloud platform comprises a container registry comprising at least a container-wrapped code module, where the code module is tested for vulnerability and is in compliance with a wrapper application program interface (API) of the gateway.

The present disclosure provides a cloud platform that can allow for the retrieval of container-based custom research code modules from secured container registries such as Docker Hub or AWS Elastic Container Registry (ECR) such as the registry linking 1705, image registry 114 and various other components in FIG. 14. These custom code containers may be imported and sandboxed to a staging area on the cloud to perform vulnerability and malware testing.

These custom code containers may also be used for compliance with enhanced gateway edge system wrapper APIs that may allow the module to communicate with the rest of the gateway edge system's modules for data orchestration and interoperability. The cloud deployment platform may make use of existing IoT component deployment capabilities to deploy the module to the selected gateway edge system or gateway edge systems. The platform can also facilitate basic post-deployment health checks and connectivity testing of the custom research code modules.

The gateway edge system may have comprehensive capabilities for interoperability. The gateway edge system may allow for the ingestion and output of data and images in various healthcare data formats, while allowing for easy deployment of additional interoperability modules.

Cloud Data Repository

The present disclosure provides a cloud-based data warehousing platform that may enable the centralized aggregation of patient identifiers gathered by multiple gateway edge systems involved in multi-site research data collection. This platform can leverage HIPAA, SOC2, and HITRUST compliant architecture for gateway edge system fleet management and a radiation dose feedback cloud application. The data warehouse may be populated with limited identifiers for patients and studies intended to allow for central record access, patient deduplication, and potential linking to national databases and outcomes registries such as the national virtual pooled cancer registry. The platform may also allow for the centralized enrichment of data from external sources and potential export or data transfer back to the gateway edge systems for additional on-site research analysis.

Example: Diagnosis of Individuals with Pulmonary, Thyroid, or Pancreatic Nodule

United States Core Data for Interoperability (USCDI) FHIR interfaces may be used to accelerate cohort creation for longitudinal retrospective and prospective trials without a need for institutional data warehouses. FHIR may provide a technical capability that may be easier than retrieving data from institution-specific data warehouses, a process that may be expensive, time consuming, and may not scale across health systems.

FHIR Encounter and Condition searches may be used to identify patients with a diagnosis of thyroid, pulmonary, or pancreatic nodule through FHIR searches of Encounter and Condition resources (USCDI v1 2020) (FHIR nodule cohort). Additionally, once the cohort of patients with nodules is established, all encounters, diagnoses, and conditions may be retrieved to identify patients who also have a cancer diagnosis. This group of patients may comprise an EHR diagnosis cohort.

In parallel, all CT, MRI, and US reports may be retrieved via FHIR Diagnostic Report searches (USCDI v2, 2021) performed in the same date range. Searches may be limited to imaging studies that are likely to contain nodule diagnosis, including CT, MRI, and US of the neck, chest, and abdomen. This body of reports may be analyzed with an LLM to identify a cohort of patients with an imaging diagnosis of a nodule.

Using the LLM-based lung nodule detection model applied to the results and impression sections of the medical imaging reports from the identified cohort of patients, patients in whom a small, <1 cm nodule was identified in the report may be captured. In the interest of identifying patients with new nodules, the report from the first time a nodule was identified may be included and subsequent surveillance examinations of the same nodules may be dropped. In order to focus the analysis on patients with small incidental nodules, the analysis may be limited to patients who were cancer free at the time of imaging, to differentiate small incidental nodules from known cancer or likely recurrent cancer. The diagnostic codes associated with each patient's health care visit during the 12 months prior to the reference CT may be extracted from the EHR. Patients who have at least 2 diagnostic codes for a single cancer other than non-melanomatous skin cancer may be presumed to have cancer and may be excluded.

A pixel-based lung nodule detection module may be deployed. This module may be applied to the imaging exams of all patients included in the cohort in whom a lung nodule was identified. The module may receive the list of study identifiers from the LLM-based nodule detection, may filter for only CT studies of the lung, and may perform a DICOM query/retrieve operation on the connected site PACS system to retrieve the images for those studies. The gateway edge system may then select the most appropriate series for processing and apply the pixel-based lung nodule detection module. In some cases, this module may be a lung nodule detection tool. The result may be a list of Python dictionaries of predicted box, classification label, and classification score for the detected nodules.

Information of patients with identified nodules from reports or imaging exams from two sites may be combined into a single cohort by sending patient names and key identifiers (social security numbers, birth date, address) to the central cloud platform described elsewhere herein. While the identified data may be centralized for the purpose of de-identifying duplicates and preparing the data for external linkage (e.g., linking the data with the national virtual pooled cancer registry), no other patient-specific data may be uploaded to the cloud platform. Variables extracted from radiology image data and clinical information extracted from the EHR may remain on the research-enhanced gateway edge systems.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" in some cases refers to an amount that is approximately the stated amount.

As used herein, the term "about" refers to an amount that is near the stated amount by 10%, 5%, or 1%, including increments therein.

As used herein, the term "about" in reference to a percentage refers to an amount that is greater or less than the stated percentage by 10%, 5%, or 1%, including increments therein.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Computing System

Figure 2:
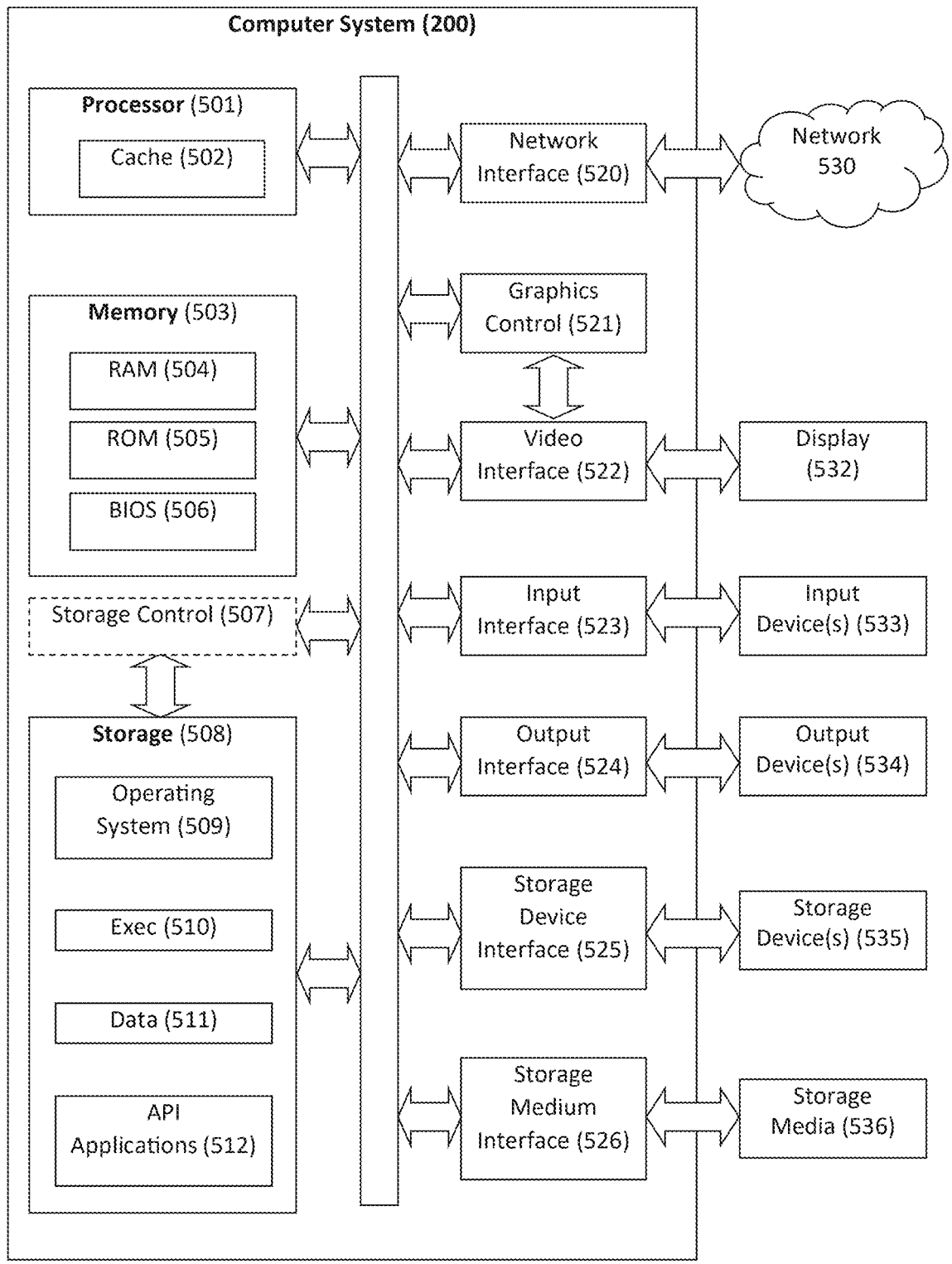
FIG. 2 shows a non-limiting example of a computing device; in this case, a device with one or more processors, memory, storage, and a network interface, in accordance with some embodiments.

Referring to FIG. 2, a block diagram is shown depicting an exemplary machine that includes a computer system 500 (e.g., a processing or computing system) within which a set of instructions can cause a device to perform or execute any one or more of the aspects and/or methodologies for static code scheduling of the present disclosure. The components in FIG. 2 are examples only and do not limit the scope of use or functionality of any hardware, software, embedded logic component, or a combination of two or more such components implementing particular embodiments.

Computer system 500 may include one or more processors 501, a memory 503, and a storage 508 that communicate with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various tangible storage media 536. All of these elements may interface directly or via one or more interfaces or adaptors to the bus 540. For instance, the various tangible storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 500 includes one or more processor(s) 501 (e.g., central processing units (CPUs) or general-purpose graphics processing units (GPGPUs)) that carry out functions. Processor(s) 501 optionally contains a cache memory unit 502 for temporary local storage of instructions, data, or computer addresses. Processor(s) 501 are configured to assist in execution of computer readable instructions. Computer system 500 may provide functionality for the components depicted in FIG. 2 as a result of the processor(s) 501 executing non-transitory, processor-executable instructions embodied in one or more tangible computer-readable storage media, such as memory 503, storage 508, storage devices 535, and/or storage medium 536. The computer-readable media may store software that implements particular embodiments, and processor(s) 501 may execute the software. Memory 503 may read the software from one or more other computer-readable media (such as mass storage device(s) 535, 536) or from one or more other sources through a suitable interface, such as network interface 520. The software may cause processor(s) 501 to carry out one or more processes or one or more steps of one or more processes described or illustrated herein. Carrying out such processes or steps may include defining data structures stored in memory 503 and modifying the data structures as directed by the software.

The memory 503 may include various components (e.g., machine readable media) including, but not limited to, a random-access memory component (e.g., RAM 504) (e.g., static RAM (SRAM), dynamic RAM (DRAM), ferroelectric random-access memory (FRAM), phase-change random access memory (PRAM), etc.), a read-only memory component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable tangible computer-readable media described below. In one example, a basic input/output system 506 (BIOS), including basic routines that help to transfer information between elements within computer system 500, such as during start-up, may be stored in the memory 503.

Fixed storage 508 is connected bidirectionally to processor(s) 501, optionally through storage control unit 507. Fixed storage 508 provides additional data storage capacity and may also include any suitable tangible computer-readable media described herein. Storage 508 may be used to store operating system 509, executable(s) 510, data 511, applications 512 (application programs), and the like. Storage 508 can also include an optical disk drive, a solid-state memory device (e.g., flash-based systems), or a combination of any of the above. Information in storage 508 may, in appropriate cases, be incorporated as virtual memory in memory 503.

In one example, storage device(s) 535 may be removably interfaced with computer system 500 (e.g., via an external port connector (not shown)) via a storage device interface 525. Particularly, storage device(s) 535 and an associated machine-readable medium may provide non-volatile and/or volatile storage of machine-readable instructions, data structures, program modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, specifically mobile devices and enterprise systems, distributed computing systems, cloud storage systems, cloud computing systems, and the like, connected to network 530. Communications to and from computer system 500 may be sent through network interface 520. For example, network interface 520 may receive incoming communications (such as requests or responses from other devices) in the form of one or more packets (such as Internet Protocol (IP) packets) from network 530, and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 530, may employ a wired and/or a wireless mode of communication. In general, any network topology may be used.

Information and data can be displayed through a display 532. Examples of a display 532 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 532, computer system 500 may include one or more other peripheral output devices 534 including, but not limited to, an audio speaker, a printer, a storage device, and any combinations thereof. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both.

To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein.

Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, NintendoR Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object-oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 3:
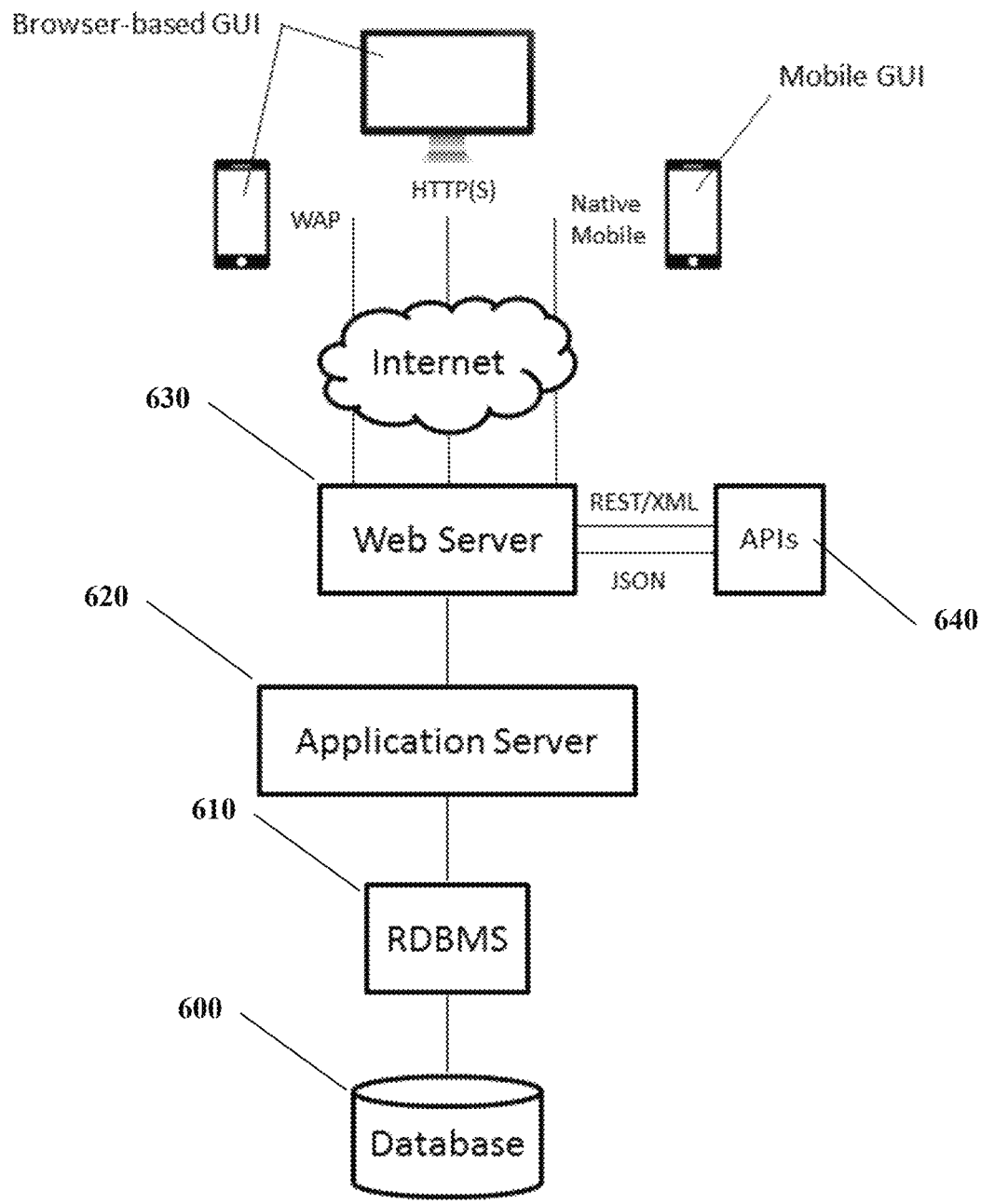
FIG. 3 shows a non-limiting example of a web/mobile application provision system; in this case, a system providing browser-based and/or native mobile user interfaces, in accordance with some embodiments.

Referring to FIG. 3, in a particular embodiment, an application provision system comprises one or more databases 600 accessed by a relational database management system (RDBMS) 610. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 620 (such as Java servers, .NET servers, PHP servers, and the like) and one or more web servers 630 (such as Apache, IIS, GWS and the like). The web server(s) optionally expose one or more web services via app application programming interfaces (APIs) 640. Via a network, such as the Internet, the system provides browser-based and/or mobile native user interfaces.

Figure 4:
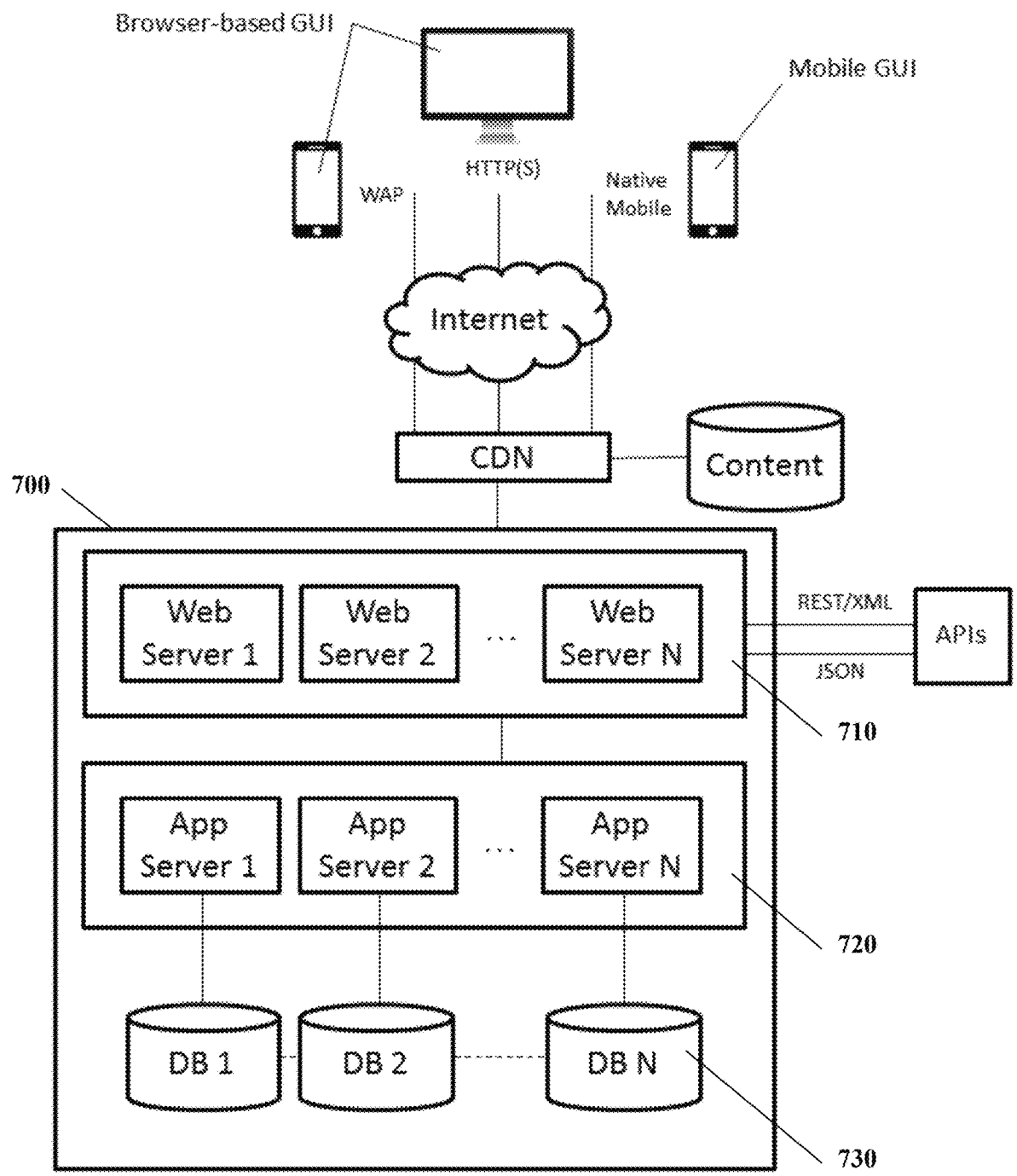
FIG. 4 shows a non-limiting example of a cloud-based web/mobile application provision system; in this case, a system comprising an elastically load balanced, auto-scaling web server and application server resources as well as synchronously replicated databases, in accordance with some embodiments.

Referring to FIG. 4, in a particular embodiment, an application provision system alternatively has a distributed, cloud-based architecture 700 and comprises elastically load balanced, auto-scaling web server resources 710 and application server resources 720 as well synchronously replicated databases 730.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash© Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of medical imaging information. In various embodiments, suitable databases include, by way of non-limiting examples, relational databases, non-relational databases, object-oriented databases, object databases, entity-relationship model databases, associative databases, and XML databases.

Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In a particular embodiment, a database is a distributed database. In other embodiments, a database is based on one or more local computer storage devices.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A gateway edge system comprising:
a data orchestration engine comprising a plurality of modules configured to receive and process data according to a workflow and dynamically route the processed data to one or more entities that are in communication with the gateway edge system, wherein the gateway edge system is configured to be deployed within a firewall of a healthcare system, wherein the plurality of modules comprises an ingestion and normalization module configured to:
i) receive input data from a plurality of electronic data sources located within the healthcare system, wherein the plurality of electronic data sources comprises at least two different sources and wherein the at least two different sources comprise an electronic health record (EHR) system, a radiology electronic clinical data system, Picture Archiving and Communication System (PACS), radiation dose data, a billing system or a claim system; and
ii) normalize the input data by mapping to a standardized data model, and wherein the plurality of modules further comprises a translation engine configured to process the normalized input data to extract a plurality of elements and translate the plurality of elements into a plurality of variables.

2. The gateway edge system of claim 1, wherein the standardized data model comprises a Fast Healthcare Interoperability Resources (FHIR) standard.

3. The gateway edge system of claim 1, wherein the plurality of modules further comprises a clinical quality measure computation component configured to compute, based at least in part on the plurality of variables, a clinical quality measure indicative of whether a radiation dose is excessive, within a safe range, or inadequate.

4. The gateway edge system of claim 1, wherein the data received from the EHR system comprises at least one of a radiology report, a pathology report, a clinical report, a radiation dose data, diagnostic data, study or test order related data including International Classification of Diseases, Tenth Revision, Clinical Modification (ICD-10-CM) code and Current Procedural Terminology (CPT) codes associated with a test, a study request including Logical Observation Identifiers Names and Codes (LOINC), a clinical indication for the test, or data related to a reason for the test.

5. The gateway edge system of claim 1, wherein a selection and an order of modules in the plurality of modules are determined based at least in part on the workflow and a type of the data.

6. The gateway edge system of claim 5, wherein the selection and the order of modules in the plurality of modules are determined based at least in part by utilizing a trained machine learning model or a large language model (LLM).

7. The gateway edge system of claim 1, wherein the gateway edge system is configured to be deployed in a virtual infrastructure of the healthcare system, and wherein the gateway edge system is further configured to interface with the one or more electronic data sources within the healthcare system to receive the data via a local network.

8. The gateway edge system of claim 1, wherein the gateway edge system is configured to provide a standardized connection between the healthcare system and the one or more entities.

9. The gateway edge system of claim 1, wherein the gateway edge system is configured to be remotely managed by a cloud console.

10. The gateway edge system of claim 1, wherein the gateway edge system is configured to calculate the clinical quality measure substantially in real-time upon receipt of the data, and wherein the data is received via a data push model of a data orchestration engine.

11. The gateway edge system of claim 1, wherein the data comprises medical image data, and wherein the gateway edge system is configured to execute a containerized code at runtime for processing the medical image data.

12. The gateway edge system of claim 11, wherein the gateway edge system is configured to be in remote communication with a cloud platform comprising a registry, and wherein the registry comprises at least one code module configured to be deployed to the gateway edge system for execution.

13. The gateway edge system of claim 12, wherein the at least one code module comprises a container-wrapped code module.

14. The gateway edge system of claim 12, wherein the at least one code module is configured to be tested for vulnerability and is in compliance with a wrapper application program interface (API) of the gateway edge system.

15. The gateway edge system of claim 1, wherein the data comprises patient names and/or key identifiers, and wherein the gateway edge system comprises a visualization module configured to allow external users or entities to access the data without leaving the firewall of the healthcare system.

16. A gateway edge system comprising:
a data orchestration engine comprising a plurality of modules configured to receive and process data according to a workflow and dynamically route the processed data to one or more entities that are in communication with the gateway edge system, wherein the gateway edge system is configured to be deployed within a firewall of a healthcare system, and wherein the plurality of modules comprises an ingestion and normalization module configured to:
i) receive input data from a plurality of electronic data sources located within the healthcare system, wherein the plurality of electronic data sources comprises at least two different sources and wherein the at least two different sources comprise an electronic health record (EHR) system, a radiology electronic clinical data system, Picture Archiving and Communication System (PACS), radiation dose data, a billing system or a claim system; and
ii) normalize the input data by mapping to a standardized data model;
wherein the ingestion and normalization module is further configured to provide predefined and configurable clinical data endpoints for immediate connectivity,
and wherein the data comprises at least one of image data, video data, free text-based data, or structured data.

17. The gateway edge system of claim 16, wherein the standardized data model comprises a Fast Healthcare Interoperability Resources (FHIR) standard.

18. The gateway edge system of claim 16, wherein the data received from the EHR system comprises at least one of a radiology report, a pathology report, a clinical report, a radiation dose data, diagnostic data, study or test order related data including International Classification of Diseases, Tenth Revision, Clinical Modification (ICD-10-CM) code and Current Procedural Terminology (CPT) codes associated with a test, a study request including Logical Observation Identifiers Names and Codes (LOINC), a clinical indication for the test, or data related to a reason for the test.

19. A gateway edge system comprising:
a data orchestration engine comprising a plurality of modules configured to receive and process data according to a workflow and dynamically route the processed data to one or more entities that are in communication with the gateway edge system, wherein the gateway edge system is configured to be deployed within a firewall of a healthcare system, and wherein the plurality of modules comprises an ingestion and normalization module configured to:
i) receive input data from a plurality of electronic data sources located within the healthcare system, wherein the plurality of electronic data sources comprises at least two different sources and wherein the at least two different sources comprise an electronic health record (EHR) system, a radiology electronic clinical data system, Picture Archiving and Communication System (PACS), radiation dose data, a billing system or a claim system;
ii) normalize the input data by mapping to a standardized data model;
iii) combine two or more data sets into a single cohort based at least in part on a patient name or key identifier identified from the two or more data sets.

20. The gateway edge system of claim 19, wherein the standardized data model comprises a Fast Healthcare Interoperability Resources (FHIR) standard.

21. The gateway edge system of claim 19, wherein the data received from the EHR system comprises at least one of a radiology report, a pathology report, a clinical report, a radiation dose data, diagnostic data, study or test order related data including International Classification of Diseases, Tenth Revision, Clinical Modification (ICD-10-CM) code and Current Procedural Terminology (CPT) codes associated with a test, a study request including Logical Observation Identifiers Names and Codes (LOINC), a clinical indication for the test, or data related to a reason for the test.

22. The gateway edge system of claim 19, wherein a selection and an order of modules in the plurality of modules are determined based at least in part on the workflow and a type of the data.

23. The gateway edge system of claim 19, wherein the gateway edge system is configured to be deployed in a virtual infrastructure of the healthcare system, and wherein the gateway edge system is further configured to interface with the one or more electronic data sources within the healthcare system to receive the data via a local network.

24. The gateway edge system of claim 19, wherein the gateway edge system is configured to provide a standardized connection between the healthcare system and the one or more entities.

25. A gateway edge system comprising:
a data orchestration engine comprising a plurality of modules configured to receive and process data according to a workflow and dynamically route the processed data to one or more entities that are in communication with the gateway edge system, wherein the gateway edge system is configured to be deployed within a firewall of a healthcare system, and wherein the plurality of modules comprises an ingestion and normalization module configured to:
i) receive input data from a plurality of electronic data sources located within the healthcare system, wherein the plurality of electronic data sources comprises at least two different sources and wherein the at least two different sources comprise an electronic health record (EHR) system, a radiology electronic clinical data system, Picture Archiving and Communication System (PACS), radiation dose data, a billing system or a claim system;
ii) normalize the input data by mapping to a standardized data model;
iii) combine two or more data sets into a single cohort based at least in part on a patient name or key identifier identified from the two or more data sets,
wherein the plurality of modules further comprises a machine-learning based module configured to process the data locally within the firewall of the healthcare system, and wherein the machine-learning based module is further configured to perform multi-step data processing.

26. The gateway edge system of claim 25, wherein the standardized data model comprises a Fast Healthcare Interoperability Resources (FHIR) standard.

27. The gateway edge system of claim 25, wherein the data received from the EHR system comprises at least one of a radiology report, a pathology report, a clinical report, a radiation dose data, diagnostic data, study or test order related data including International Classification of Diseases, Tenth Revision, Clinical Modification (ICD-10-CM) code and Current Procedural Terminology (CPT) codes associated with a test, a study request including Logical Observation Identifiers Names and Codes (LOINC), a clinical indication for the test, or data related to a reason for the test.

28. The gateway edge system of claim 25, wherein a selection and an order of modules in the plurality of modules are determined based at least in part on the workflow and a type of the data.

29. The gateway edge system of claim 25, wherein the gateway edge system is configured to be deployed in a virtual infrastructure of the healthcare system, and wherein the gateway edge system is further configured to interface with the one or more electronic data sources within the healthcare system to receive the data via a local network.

30. The gateway edge system of claim 25, wherein the gateway edge system is configured to provide a standardized connection between the healthcare system and the one or more entities.

31. The gateway edge system of claim 25, wherein the gateway edge system is configured to be remotely managed by a cloud console.

32. The gateway edge system of claim 25, wherein the gateway edge system is configured to calculate the clinical quality measure substantially in real-time upon receipt of the data, and wherein the data is received via a data push model of a data orchestration engine.

33. The gateway edge system of claim 25, wherein the data comprises medical image data, and wherein the gateway edge system is configured to execute a containerized code at runtime for processing the medical image data.

34. The gateway edge system of claim 25, wherein the data comprises patient names and/or key identifiers, and wherein the gateway edge system comprises a visualization module configured to allow external users or entities to access the data without leaving the firewall of the healthcare system.

\* \* \* \* \*